United States Patent
Lee

(10) Patent No.: US 11,501,020 B2
(45) Date of Patent: Nov. 15, 2022

(54) METHOD FOR ANONYMIZING PERSONAL INFORMATION IN BIG DATA AND COMBINING ANONYMIZED DATA

(71) Applicant: BOALA CO., LTD., Seoul (KR)

(72) Inventor: Won Suk Lee, Seoul (KR)

(73) Assignee: BOARA CO., LTD., Seoul (KR)

( * ) Notice: Subject to any disclaimer, the term of this patent is extended or adjusted under 35 U.S.C. 154(b) by 47 days.

(21) Appl. No.: 17/040,777

(22) PCT Filed: Dec. 30, 2018

(86) PCT No.: PCT/KR2018/016945
§ 371 (c)(1),
(2) Date: Sep. 23, 2020

(87) PCT Pub. No.: WO2019/190030
PCT Pub. Date: Oct. 3, 2019

(65) Prior Publication Data
US 2021/0004490 A1  Jan. 7, 2021

(30) Foreign Application Priority Data

Mar. 30, 2018 (WO) ................ PCT/KR2018/003795

(51) Int. Cl.
*G06F 21/62* (2013.01)
*G06F 16/22* (2019.01)
*G06F 16/2458* (2019.01)
*G06F 16/25* (2019.01)

(52) U.S. Cl.
CPC ...... *G06F 21/6254* (2013.01); *G06F 16/2282* (2019.01); *G06F 16/2465* (2019.01); *G06F 16/258* (2019.01)

(58) Field of Classification Search
None
See application file for complete search history.

(56) References Cited

U.S. PATENT DOCUMENTS

| | | | |
|---|---|---|---|
| 2002/0152201 A1* | 10/2002 | Nanavati | G06F 16/30 |
| 2014/0172854 A1* | 6/2014 | Huang | G06F 21/6245 |
| | | | 707/737 |
| 2015/0033356 A1* | 1/2015 | Takenouchi | G06F 21/6254 |
| | | | 726/26 |
| 2015/0294121 A1* | 10/2015 | Yamaoka | G06F 16/254 |
| | | | 726/26 |
| 2017/0124335 A1* | 5/2017 | Freudiger | G06F 21/602 |
| 2017/0177683 A1* | 6/2017 | Koike | G06F 21/6254 |
| 2019/0147988 A1* | 5/2019 | Sharifi Sedeh | G16H 10/60 |
| | | | 705/3 |

FOREIGN PATENT DOCUMENTS

| | | | |
|---|---|---|---|
| JP | 2015-232863 | A | 12/2015 |
| JP | 6007969 | B2 | 10/2016 |
| JP | 6079783 | B2 | 2/2017 |
| KR | 10-2017-0052465 | A | 5/2017 |
| KR | 10-1784265 | B1 | 10/2017 |

* cited by examiner

*Primary Examiner* — Tony Mahmoudi
*Assistant Examiner* — Umar Mian
(74) *Attorney, Agent, or Firm* — Novick, Kim & Lee PLLC; Jae Youn Kim

(57) ABSTRACT

A method for anonymizing and combining personal information in big data, by which big data is anonymized to be freely distributed to an external system without fear of personal information leakage and distributed data can be combined with each other is proposed.

11 Claims, 24 Drawing Sheets

Synchronization dictionary

| Resident registration number synchronization dictionary $D_{Resident\ registration\ number}$ |
|---|
| 568 |
| 572 |
| 604 |
| 626 |
| 649 |
| 657 |

Synchronization table

| Starting value | End value |
|---|---|
| 568 | 572 |
| 604 | 626 |
| 649 | 657 |

Cell sectionalization

| Cell start value | Cell end value | Frequency |
|---|---|---|
| 550 | 580 | 2 |
| 587 | 629.1 | 2 |
| 630.17 | 661.94 | 2 |

$\Theta(C_i) = 2$
$e_{min} = 2, e_{max} = 8$ step1) Group every two adjacent values among synchronization dictionary values

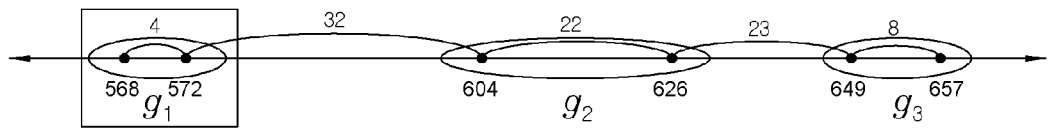

Groups are defined in order of $g_1, g_3, g_2$ from smallest gap steps 2 and 3) Add error to define each group as one cell  ($g_i$: $i^{th}$ group)

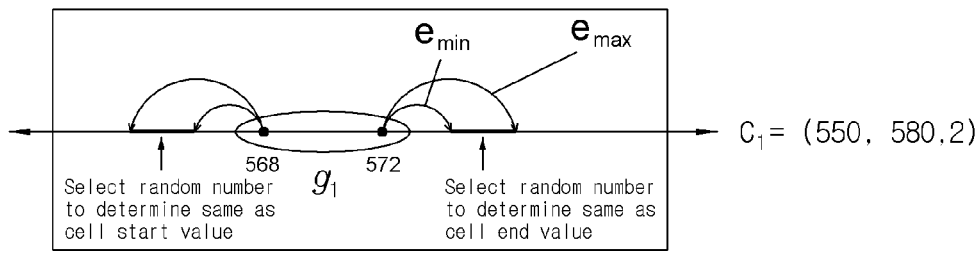

$C_1 = (550, 580, 2)$

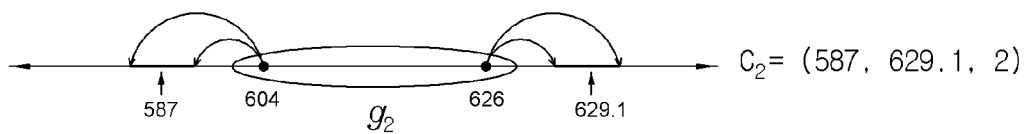

$C_2 = (587, 629.1, 2)$

$C_3 = (630.17, 661.94, 2)$

Add error to ensure re-identification impossibility
($e_{min}$: minimum error, $e_{max}$: maximum error)

FIG. 6a

Cell sectionalization result without applying maximum cell size

Cell sectionalization result to which maximum cell size is applied

Cell sectionalization result from individual
synchronization dictionary A

● : Synchronization dictionary value (A)

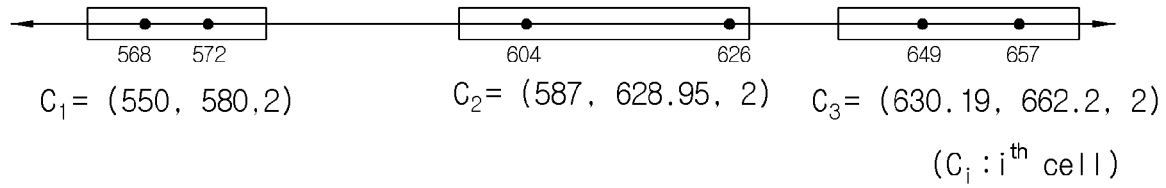

$C_1 = (550, 580, 2)$   $C_2 = (587, 628.95, 2)$   $C_3 = (630.19, 662.2, 2)$ ($C_i$ : $i^{th}$ cell)

Cell sectionalization result from local synchronization dictionary
including synchronization dictionary A ● : Synchronization dictionary value (A)   X: Value of local synchronization dictionary other than A

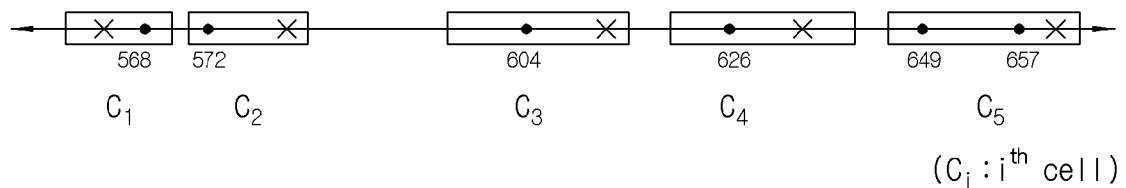

$C_1$   $C_2$   $C_3$   $C_4$   $C_5$ ($C_i$ : $i^{th}$ cell)

FIG. 7c a. <Disease Status Anonymous Data Set> A

| | Synchronization attribute | | Age | Disease name |
|---|---|---|---|---|
| | Cell start value | Cell end value | | |
| A1 | 600 | 640 | 20s | *cancer |
| A2 | 600 | 640 | 20s | Hypertension | b. <Annual Salary Anonymous Data Set> B

| | Synchronization attribute | | Gender | Annual salary (ten thousand won) |
|---|---|---|---|---|
| | Cell start value | Cell end value | | |
| B1 | 590 | 620 | Male | [3000-3500] |
| B2 | 630 | 660 | Female | [3500-4000] | c. Combine based on cell and calculate reliability

| | Synchronization attribute | | Age | Disease name | | Synchronization attribute | | Gender | Annual salary (ten thousand won) | Synchronization validity reliability |
|---|---|---|---|---|---|---|---|---|---|---|
| | Cell start value | Cell end value | | | | Cell start value | Cell end value | | | |
| A1 | 600 | 640 | 20s | *cancer | B1 | 590 | 620 | Male | [3000-3500] | 0.333 |
| A1 | 600 | 640 | 20s | *cancer | B2 | 630 | 660 | Female | [3500-4000] | 0.333 |
| A2 | 600 | 640 | 20s | Hypertension | B1 | 590 | 620 | Male | [3000-3500] | 0.083 |
| A2 | 600 | 640 | 20s | Hypertension | B2 | 630 | 660 | Female | [3500-4000] | 0.083 |

FIG. 11b

Anonymous data D1

| Anonymous identifier 1 | Name |
|---|---|
| 354365 | Hong |
| 428435 | Lee |
| 213225 | Heo |
| 343341 | Kim |
| 323329 | Lee |

Anonymous data D2

| Anonymous identifier 2 | Name |
|---|---|
| 312321 | Hong |
| 387394 | Lee |
| 326336 | Heo |
| 246254 | Kim |
| 442454 | Lee |

Anonymous matching

| Anonymous identifier 1 | Anonymous identifier 2 | Name |
|---|---|---|
| 354365 | 312321 | Hong |
| 428435 | 387394 | Lee |
| 213225 | 326336 | Heo |
| 343341 | 246254 | Kim |

FIG. 13b

METHOD FOR ANONYMIZING PERSONAL INFORMATION IN BIG DATA AND COMBINING ANONYMIZED DATA

TECHNICAL FIELD

The present invention relates to a method for anonymizing personal information in big data and combining anonymized data, and more particularly, to a method for anonymizing personal information in big data and combining anonymized data, capable of reliably anonymizing the big data so that the big data may be freely distributed to an external system without fear of leakage of the personal information, and enabling analysis by combining distributed data.

BACKGROUND ART

Big data refers to data including all unstructured or semi-structured data that has not been previously utilized, such as electronic commerce data, metadata, web logs, radio frequency identification (RFID) data, sensor network data, social network data, social data, Internet texts and documents, and Internet search indexing, as well as structured data used in an existing business environment or public institutions. Such data is generally referred to as big data in a sense that the big data has an amount that is difficult to be handled by ordinary software tools and computer systems.

Recently, the government as well as companies has been attempting to actively use big data information collected in various ways and statistical analysis data obtained by using the big data information for decision making and a policy decision. The big data processing technology for constructing a data-driven computing environment by using the big data has been actively researched.

Meanwhile, the big data is analyzed and utilized within an organization where the data is collected. However, attributes of the collected data may vary according to the organization collecting the data so that the necessity to use data from other organizations occurs. Even for organizations that do not have the ability or a system to collect data, the necessity to analyze information that the organization uniquely needs based on big data of other organizations or a combination thereof and use the information for the decision making is emerging.

However, since an amount of data is massive due to the nature of big data, and most of the big data inevitably includes information on personal details, there is a high possibility of legal disputes resulting from the leakage of personal detail information, so that there has been a limit to the exchange or distribution of the big data among organizations.

Accordingly, from a perspective of organizations that may collect the big data, most of the big data has been processed and provided to the extent of statistical information rather than being processed and distributed for business purposes in order to avoid the legal disputes resulting from the leakage of the personal detail information. Meanwhile, from a perspective of organizations that need to use the big data, it has been difficult to obtain analysis data necessary for a unique business environment of the organization.

In order to solve the above problems, big data processing systems and methods for grouping data, or anonymizing (de-identifying) personal attributes through masking, substitution, semi-identification, and categorization are being applied to some fields.

The masking refers to a scheme of masking or deleting target information (e.g., 670101-10491910→**************), the substitution refers to a scheme of substituting the target information with information generated to correspond to the target information (e.g., 670101-10491910→ID2311331), the semi-identification refers to a scheme of semi-identifying the target information so that only a part of the target information is displayed (e.g., 670101-10491910→67-1), and the categorization refers to a scheme of categorizing and classifying the target information (e.g., 670101-10491910→male).

Meanwhile, as the complexity of data increases with the advent of the big data era, the combination of data is becoming more important for more efficient data analysis.

In particular, analysis for individuals that is more extensive may be performed by combining personal information data from different fields for the same personal record.

In order to combine records of the same person existing in mutually different personal information data, the same personal identifier has to exist in a combination target data set, and target records are joined to each other based on the identifier so as to be used for the analysis.

However, in a case of data to which a conventional anonymization scheme as described above is applied, a specific person may be re-identified due to the personal identifier corresponding to the person one-to-one. Meanwhile, a personal identification attribute has been anonymized and removed from the combination target data set, so that the data may not be easily combined based on the personal identification attribute commonly belonging to a plurality of data sets. Accordingly, it has been difficult to combine information on the same person from the plurality of data sets into one and use the combined information for the analysis.

DISCLOSURE

Technical Problem

The present invention has been made in order to solve the problems of conventional anonymized big data as described above, and an object of the present invention is to provide a method for anonymizing personal information in big data and combining anonymized data, capable of preventing re-identification of the personal information of the anonymized data so that the big data may be freely distributed to an external system without fear of leakage of the personal information, and capable of efficiently performing combination of distributed data.

Technical Solution

To achieve the objects described above, according to the present invention, there is provided a method for processing big data, in which the method is performed in a data server having a communication unit, a processing unit, and a storage unit to anonymize personal information in the big data, the method including: forming a synchronization dictionary by converting synchronization target personal identification attribute values of an original personal identification data set into surrogate values substituting for the attribute values; forming a synchronization table having information on a starting value and an end value of each of groups by grouping the values of the synchronization dictionary in a unit of at least one consecutive k (k≥1); a cell sectionalization step of forming cell sections having information on a new starting value and a new end value by applying an error value to the information on the starting value and the end value of each of the groups of the synchronization table corresponding to the personal identification attribute value, for each of the personal identification attribute values of the original personal identification data set; and changing the personal identification attribute values of the original personal identification data set to correspond to section values of cells, respectively, so as to assign the changed value as a synchronization attribute value of an anonymous data set.

According to such aspects of the present invention, surrogate values substituting for synchronization target personal identification attribute values of an original personal identification data set are grouped, an error are applied to each group to define the group as a cell, and a synchronization attribute formed based on section information of the defined cell are assigned to anonymized data instead of the personal identification attribute value, so that the anonymized data, in which all the personal identification attribute values of the original are removed, error values are randomly added, and personal re-identification is thus extremely hard, may be externally distributed without fear of leakage of the personal information, and a plurality of distributed anonymous data sets may be combined with each other based on section information included in the synchronization attribute so as to be used for statistical analysis and the like.

Preferably, the synchronization dictionary may be formed by applying a predefined function to the synchronization target attribute value.

Preferably, the cell sectionalization step may include: setting a value, which is obtained by subtracting an arbitrary error value between a minimum error value and a maximum error value from a minimum value in the group, as a start value of the cell, and setting a value, which is obtained by adding an arbitrary error value between the minimum error value and the maximum error value to a maximum value in the group, as an end value of the cell, for each of the groups of the synchronization table.

Preferably, the synchronization attribute value may be formed as one data value obtained by concatenating the start value and the end value of the cell.

Preferably, the synchronization dictionary may be formed by obtaining union of individual synchronization dictionaries that are formed by selecting a same original personal identification attribute in a plurality of mutually different original data sets as a synchronization target attribute, respectively.

Preferably, the synchronization dictionary may be formed by using a part of the synchronization target attribute value.

Preferably, when ranges of section values of synchronization attributes generated for at least two personal identification attribute values overlap each other in a case where the synchronization attributes are generated, the synchronization attributes may be regenerated so that a new error value is applied.

Preferably, with reference to cell section information of a synchronization map including synchronization attributes of a plurality of anonymous data sets, it may be determined whether cell sections corresponding to the synchronization attributes of records of the anonymous data sets overlap each other, and when the cell sections of the synchronization attributes overlap each other by a predetermined value or more, the records may be determined to correspond to a same person so that the records may be subject to an anonymous matching combination operation.

Preferably, it may be determined whether cells corresponding to two anonymous identifiers (a, b) overlap each other by an anonymous matching operation defined as follows:

anonymous matching operation a #b=(true, C(a, b)) or (false, 0)
    anonymous identifier a=(a.s, a.e), where a.s is a cell start value of a, and a.e is a cell end value of a
    anonymous identifier b=(b.s, b.e), where b.s is a cell start value of b, and b.e is a cell end value of b
    C(a, b)=a probability value that records a and b exist in an overlapping section.

Preferably, an entire domain of synchronization attribute values may be discretized in a unit of a fixed size to generate an empty anonymous identifier bucket in each of discretization sections, and the anonymous matching operation may be performed for anonymous identifiers commonly belonging to the bucket.

Preferably, the anonymous matching combination operation may be performed in a unit of a record pair of two original data sets.

Preferably, anonymous identifiers of personal identifiers of two original data sets may be collected to perform the anonymous matching combination operation on an anonymous identifier set of two anonymous data sets.

Advantageous Effects

According to the present invention, surrogate values substituting for synchronization target personal identification attribute values of an original personal identification data set are grouped, an error are applied to each group to define the group as a cell, and a synchronization attribute formed based on section information of the defined cell are assigned to anonymized data instead of the personal identification attribute value, so that the anonymized data, in which all the personal identification attribute values of the original are removed, error values are randomly added, and personal re-identification is thus extremely hard, can be externally distributed without fear of leakage of the personal information, and a plurality of distributed anonymous data sets can be combined with each other based on section information included in the synchronization attribute so as to be used for statistical analysis and the like.

DESCRIPTION OF DRAWINGS

FIG. 6a is a view for describing a cell sectionalization procedure.

FIG. 7c is a view illustrating results of the cell sectionalization in the synchronization attribute generation processes of FIGS. 7a and 7b.

FIG. 11b is a view illustrating synchronization validity reliability.

FIG. 13b is a view illustrating an arrangement combination scheme for the anonymous identifier.

MODE FOR INVENTION

Best Mode

Figure 1:
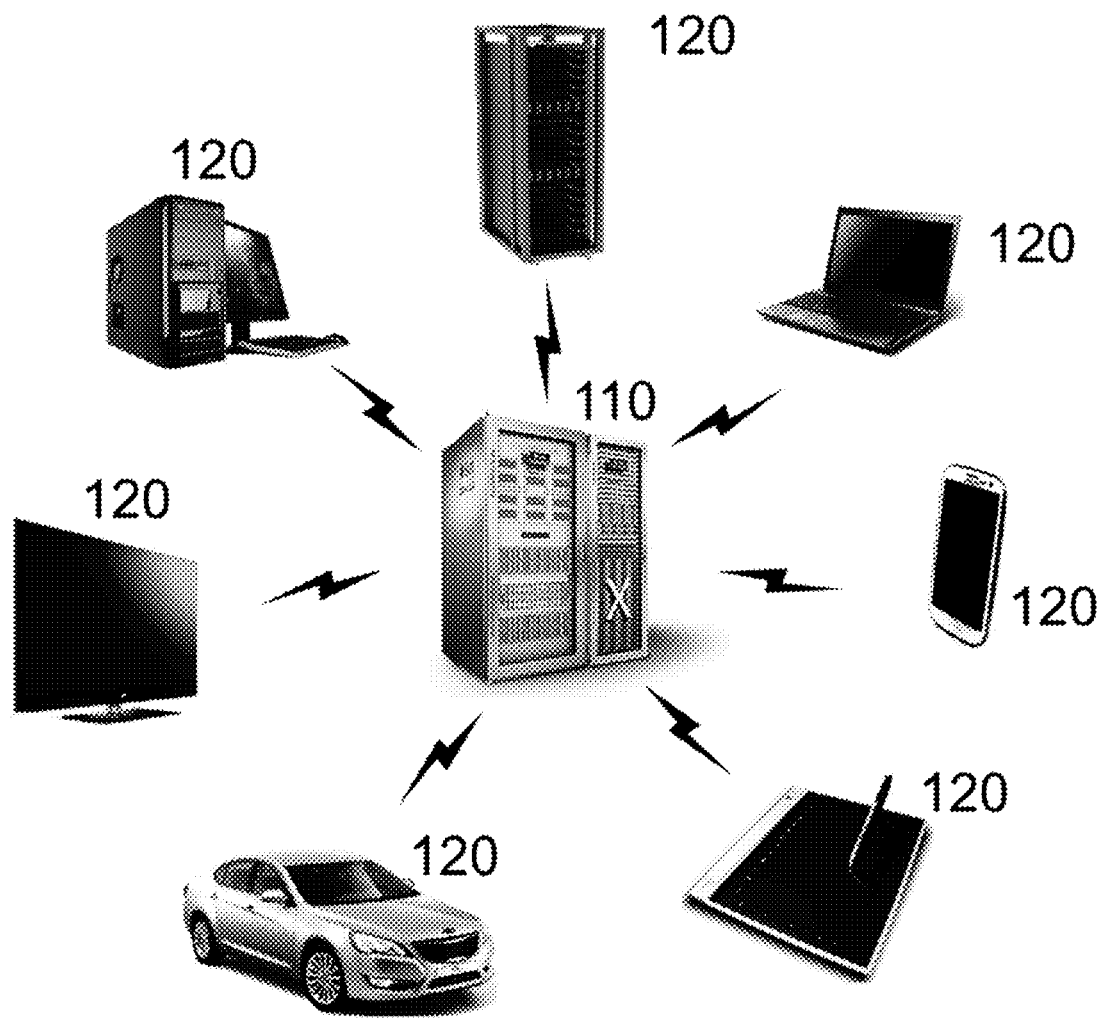
FIG. 1 is a view illustrating a data-driven computing environment constituting a big data processing system of the present invention.
Figure 2:
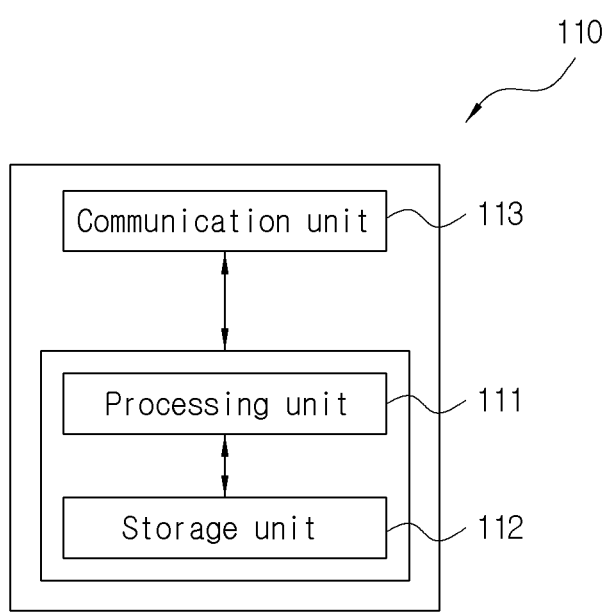
FIG. 2 is a block diagram showing main configurations of a data server shown in FIG. 1.

Hereinafter, a method for anonymizing personal information in big data and a method for combining anonymized data according to the present invention will be described in detail.

According to the present invention, in order to anonymously combine and use a plurality of original personal identification data sets, each of the original data sets may be anonymized to generate an anonymous data set.

In this case, instead of a combination target personal identification attribute of the original personal identification data set, a synchronization attribute used when combining the anonymous data sets may be assigned to each of the anonymous data sets.

In the present invention, the 'synchronization attribute' refers to an attribute assigned to an anonymous data set by anonymizing a personal identification attribute value in an original data set in order to combine anonymous data sets with each other, and a 'synchronization operation' refers to an operation of combining records of a data set based on the synchronization attribute assigned to the anonymous data set.

The synchronization attribute may be generated through: generating a synchronization dictionary by converting synchronization target personal identification attribute values of an original personal identification data set into surrogate values that may substitute for the attribute values; forming a synchronization table having a starting value and an end value of each of groups by grouping the values of the synchronization dictionary; a cell sectionalization step of applying an error value to the starting value and the end value of each of the groups of the synchronization table corresponding to an original personal identification attribute value to define an application result as a cell; and changing the personal identification attribute values of the original personal identification data set to correspond to section values of cells, respectively, so as to assign the changed value as a synchronization attribute value of an anonymous data set.

One or more synchronization attributes in an anonymous data set are collectively defined as a 'synchronization map' of the data set.

A synchronization operation refers to an operation of combining anonymous data through the synchronization map, which is a set of synchronization attributes, in which the anonymous data may be combined based on a cell corresponding to each synchronization attribute value by comparing cell sections of two synchronization maps generated from the same original personal identification attribute.

Hereinafter, a synchronization dictionary generation step, a cell sectionalization step, a synchronization attribute generation step by using a synchronization dictionary and cell sectionalization, and combination of the anonymous data sets generated as described above, that is, the synchronization operation will be sequentially described.

The synchronization dictionary may be classified into an individual synchronization dictionary, a local synchronization dictionary that is union of individual synchronization dictionaries, and a global synchronization dictionary created such that all possible values for a corresponding personal identification attribute are configured as a domain.

A step of generating the individual synchronization dictionary will be described as follows.

First, one original personal identification attribute existing in an original data set may be selected as a synchronization target attribute.

Since a person may be identified when the synchronization target attribute is used as a personal identification attribute value, the synchronization target attribute may be converted into a surrogate value substituting for the personal identification attribute value by applying a predefined eigenfunction for each type of synchronization target attributes having different meanings such as a resident registration number, a mobile phone number, and an email address.

The same eigenfunction may be applied to the same personal identification attribute, and each eigenfunction is preferably a one-to-one correspondence function while being a function having a range that is a sortable value similarly to the original personal identification attribute value.

The personal identification attribute value may be modified by applying an eigenfunction determined for each type of personal identification attributes such as a resident registration number, a mobile phone number, and an email address, so that the personal identification attribute may be removed while being converted into a sortable attribute value.

The converted attribute is defined as a synchronization dictionary for a corresponding original personal identification attribute.

Figure 3:
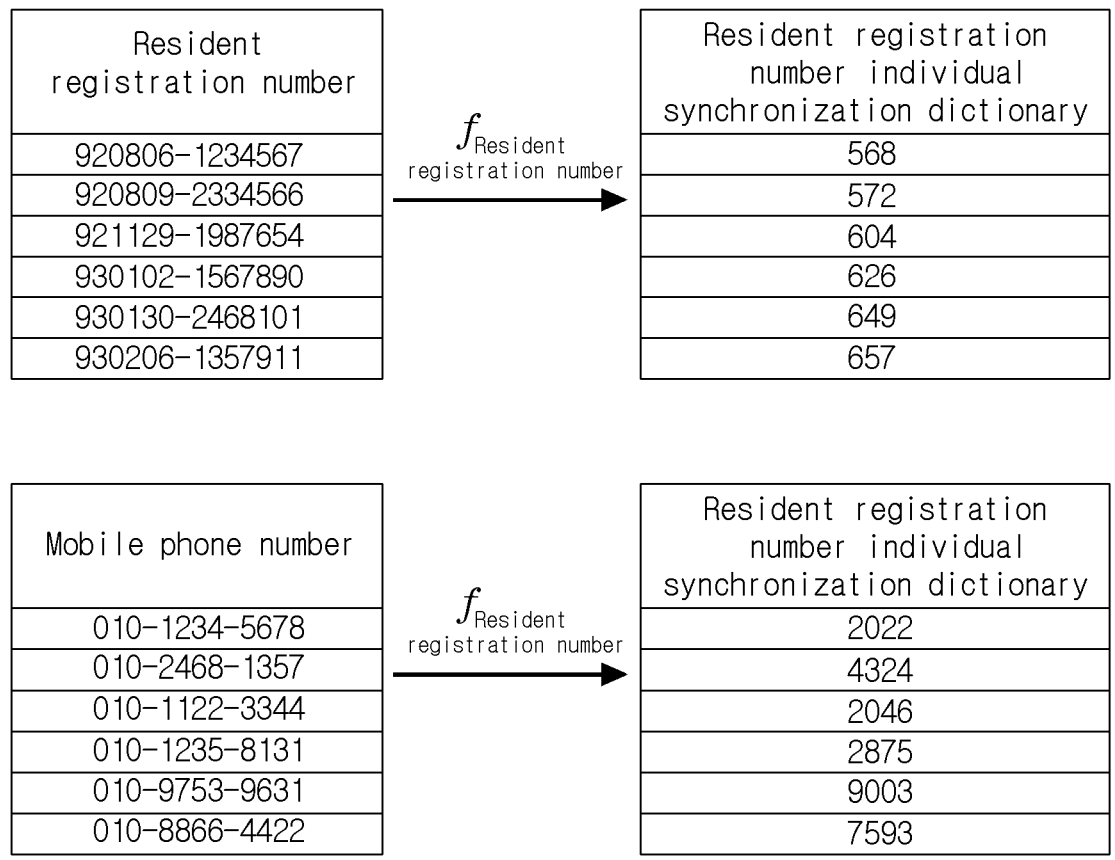
FIG. 3 is a view illustrating an individual synchronization dictionary.

FIG. 3 illustrates a process of forming an individual synchronization dictionary for each of a resident registration number attribute and a mobile phone number attribute.

When any data set has the resident registration number attribute, the same eigenfunction f (resident registration number) may be applied to the corresponding original personal identification attribute.

As illustrated in FIG. 3, a synchronization attribute generated by selecting a synchronization target attribute from an original data set and converting a personal identification attribute value existing in the original data set into a surrogate value is referred to as an individual synchronization dictionary.

The eigenfunction refers to a function of mapping individual values existing in a domain of original personal identification attribute values such as a resident registration number to a sortable range domain corresponding to the individual values one-to-one, and the eigenfunction may be defined in various ways.

In particular, when a hashing scheme is applied, a sorting order of the original personal identification attribute values may be randomly changed, so that personal re-identification may become impossible to the maximum extent. When the hashing scheme is applied, in order to minimize hash collisions, it is preferable to set as many home addresses of a hash function as possible.

The local synchronization dictionary refers to union of all individual synchronization dictionaries generated by selecting the same original personal identification attribute existing in multiple mutually different original data sets as a synchronization target attribute.

Figure 4:
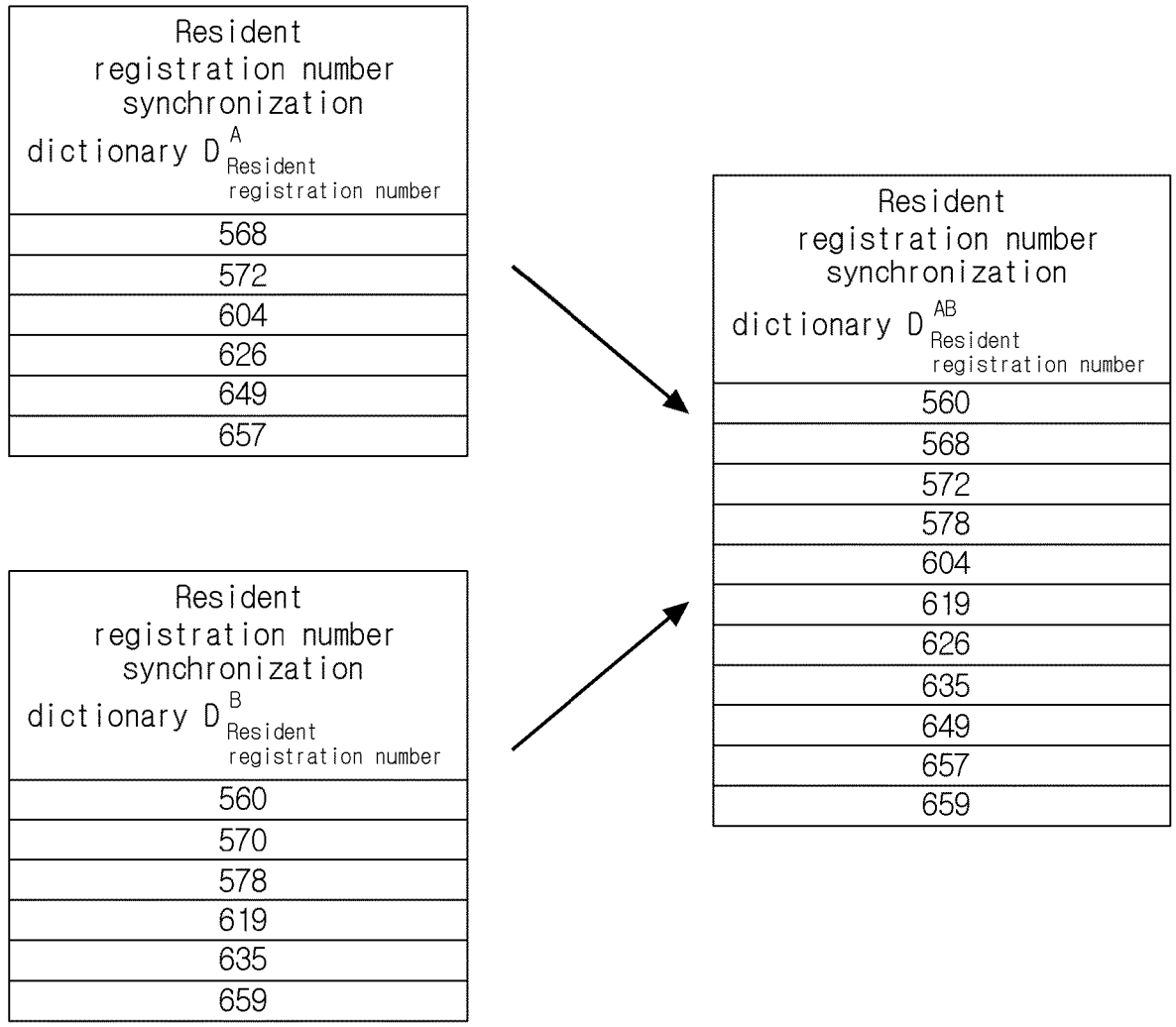
FIG. 4 is a view illustrating a local synchronization dictionary.

For example, when both an original personal identification data set A and an original personal identification data set B have resident registration number attributes within a safe space, and an individual synchronization dictionary is generated for each of the resident registration number attributes, as illustrated in FIG. 4, a local synchronization dictionary may be generated by obtaining union of the individual synchronization dictionaries.

The global synchronization dictionary refers to a dictionary generated such that all possible values for a corresponding personal identification attribute are configured as a domain.

For example, a global synchronization dictionary for resident registration numbers refers to a synchronization dictionary generated from a data set including data corresponding to resident registration numbers of all Korean citizens.

When all values of resident registration numbers of citizens exist in a single safe space, the global synchronization dictionary for the resident registration number may be generated by generating an individual synchronization dictionary for resident registration numbers by applying an eigenfunction for the resident registration numbers to the corresponding data set.

When union of individual synchronization dictionaries is continuously obtained in a local synchronization dictionary for resident registration numbers, a result may converge into the global synchronization dictionary.

Figure 5A:
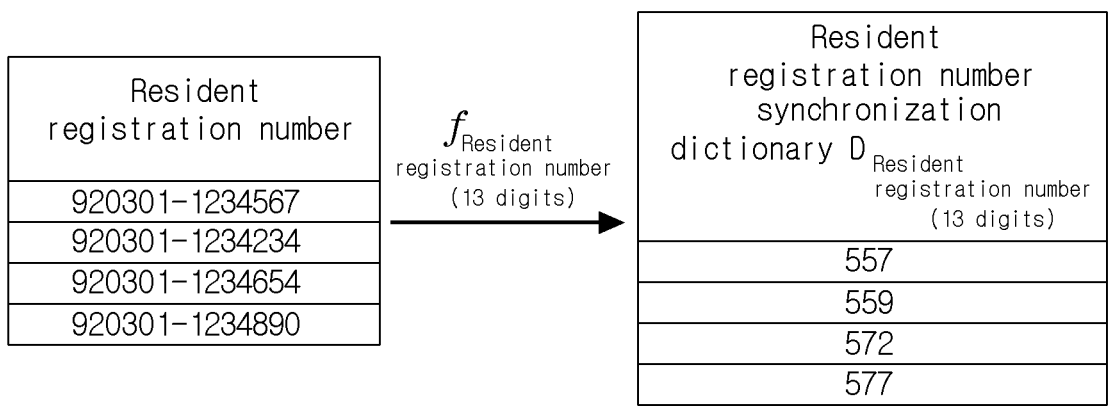
FIG. 5a is a view illustrating a synchronization dictionary generated by using all original personal identification attribute values.

Meanwhile, since the synchronization target attribute is the original personal personal identification attribute when the synchronization dictionary is generated, a person and an attribute value may correspond to each other one-to-one as illustrated in FIG. 5a, so that there is a problem of a re-identification risk before the synchronization target attribute is converted into a synchronization attribute through sectionalization.

In order to fundamentally eliminate the risk, the original personally identifiable attribute may be partially used. When only a part of the original personal identification attribute value is used without using the whole original personal identification attribute value, multiple persons may correspond to one value, so that the re-identification risk may be eliminated even for data before generation of the synchronization attribute.

Figure 5B:
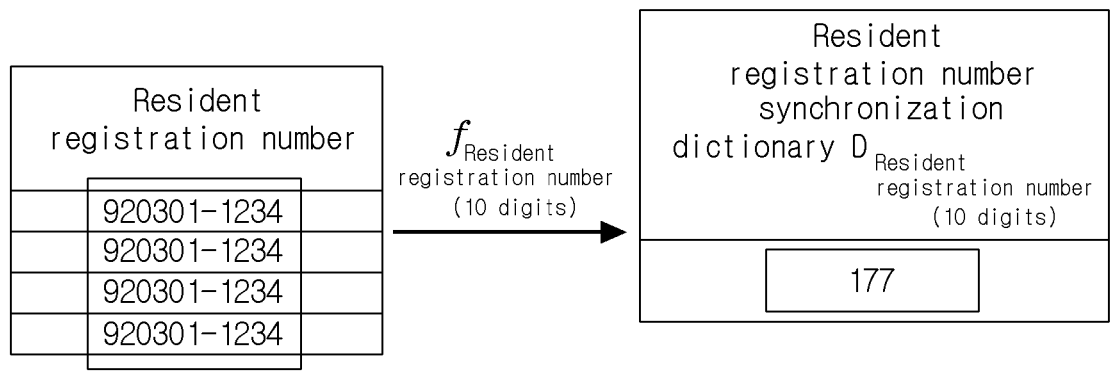
FIG. 5b is a view illustrating a synchronization dictionary generated by using a part of the original personal identification attribute values.

For example, as illustrated in FIG. 5b, when only the first 10 digits are selected and used without using 13 digits in a case of the resident registration number attribute, there is no longer one-to-one correspondence between a person and an attribute value, so that the re-identification risk may be eliminated.

However, synchronization combination accuracy may be slightly lower as compared with the scheme using the whole 13 digits.

As a scheme for compensating for the synchronization combination accuracy, there is a scheme of constructing a synchronization map by generating two or more synchronization attributes that are generated by partially using the original attributes.

For example, when only 10 digits out of 13 digits of a resident registration number are selected, the synchronization map may be constructed by using two attributes: a synchronization attribute generated by selecting only the first 10 digits; and a synchronization attribute generated by selecting only the last 10 digits. Accordingly, as the number of synchronization attributes of the synchronization map increases, the synchronization combination accuracy may be improved.

Next, the cell sectionaliiation step will be described.

Cell sectionalization refers to an operation of grouping synchronization dictionary values in a given synchronization dictionary domain and applying an error to each group to define the group as a cell. The specific procedure of the cell sectionaliiation will be described as follows.

1) A synchronization table having information on a starting value and an end value of each of groups is formed by grouping given synchronization dictionary values in a unit of consecutive k (where k denotes a cell fixed frequency and is a natural number greater than or equal to 1).

2) For each of the groups of the synchronization table, a value obtained by subtracting an arbitrary error value between a minimum error value $e_{min}$ and a maximum error value $e_{max}$ from a minimum value in the group is determined as a starting value of a corresponding cell.

3) For each of the groups of the synchronization table, a value obtained by adding an arbitrary error value between the minimum error value $e_{min}$ and the maximum error value $e_{max}$ from a maximum value in the group is determined as an end value of the corresponding cell.

The above steps will be described with an example as follows.

First, the groups may be generated in the unit of consecutive k among synchronization map values.

Each of the groups is defined as one cell, and a cell start value and a cell end value of each cell may be determined as follows.

$V_{si}$=(minimum value of synchronization surrogate attribute within group)−(random number between $e_{min}$ and $e_{max}$)

$V_{fi}$=(maximum value of synchronization surrogate attribute within group)+(random number between $e_{min}$ and $e_{max}$)

(where $e_{min}$ is a minimum error value, and $e_{max}$ is a maximum error value) FIG. 6a illustrates a cell sectionalization procedure when a fixed frequency is 2 (k=2), and a minimum error and a maximum error are 2 and 8, respectively ($e_{min}$=2, and $e_{max}$=8).

First, a group may be generated by two consecutive values among synchronization dictionary values, and a cell start value and a cell end value may be determined by adding an arbitrary error value between the minimum and maximum errors given to each group.

As described above, a cell refers to a unit for sectionalizing a synchronization dictionary domain, and has a starting value and an end value, so that the cell is defined to include a predetermined number or more of synchronization dictionary values between the starting value and the end value. The number of synchronization dictionary values existing between the start value and the end value of the cell is referred to as a cell frequency.

The start value and the end value of the cell may not be equal to the synchronization dictionary value existing in the synchronization dictionary, the start value of the cell refers to a value less than the smallest synchronization dictionary value in the cell by an arbitrary value $e_1$, and the end value of the cell refers to a value greater than the largest synchronization dictionary value in the cell by an arbitrary value $e_2$, in which $e_1$ and $e_2$ refer to error values and ensure re-identification impossibility of the synchronization dictionary value included in the cell.

The cell may be defined as a formula as follows.

1) In a domain Dom(D) of a synchronization dictionary D, an $i^{th}$ cell $C_i$ is defined as the following attribute.

$$Ci=(V_{si},V_{fi},\theta_i), V_{fi}, V_{fi} \in Dom(D), V_{si} > V_{fi}, \theta_i >= 1$$

(where $V_{si}$ is a start value of the $i^{th}$ cell, $V_{fi}$ is an end value of the $i^{th}$ cell, and $\theta_i$ is an $i^{th}$ cell frequency)

In addition, $\theta_i$ is the number of mutually different synchronization dictionary values that is greater than $V_{si}$ and less than $V_{fi}$, and is not defined for a cell without a synchronization dictionary value so that a cell frequency value is a natural number greater than or equal to 1.

2) A size of the cell $C_i$ is defined as follows.

$$size(C_i)=V_{fi}-V_{si}$$

Figure 6B:
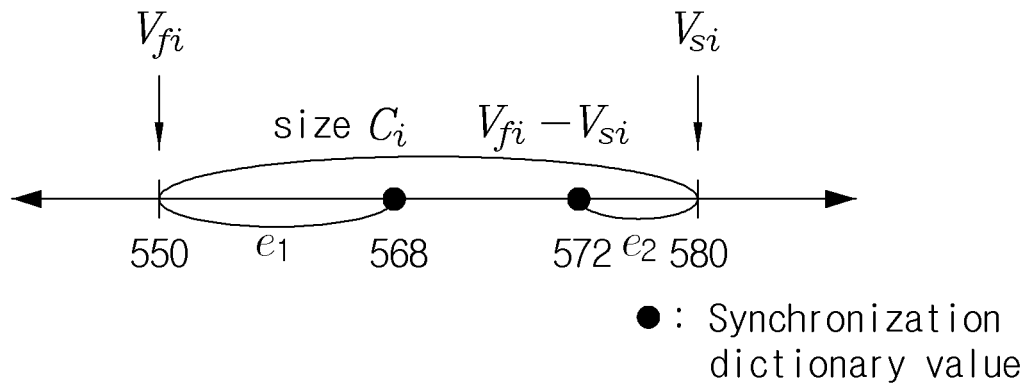
FIG. 6b is a view illustrating a sectionalized cell.

FIG. 6b is a view illustrating a sectionalized cell, and shows a cell corresponding to a group g1 of FIG. 6a as one example, in which a configuration of a cell where C=(550, 580, 2), size(C)=$V_{fi}-V_{si}$=580−550=30, and an arbitrarily added error value $e_1$ is 18, and an arbitrarily added error value $e_2$ is 8 ($e_{min}$=4, and $e_{max}$=20) is described.

Figure 6C:
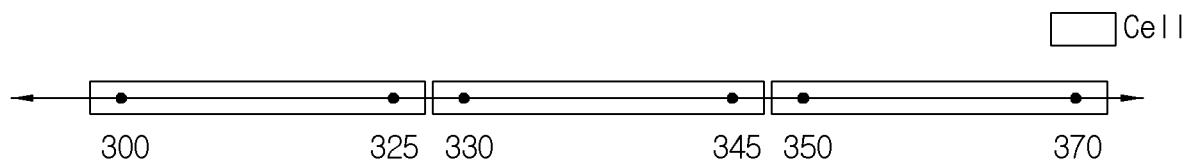
FIG. 6c is a view illustrating optimization of a cell size.
Figure 6C:
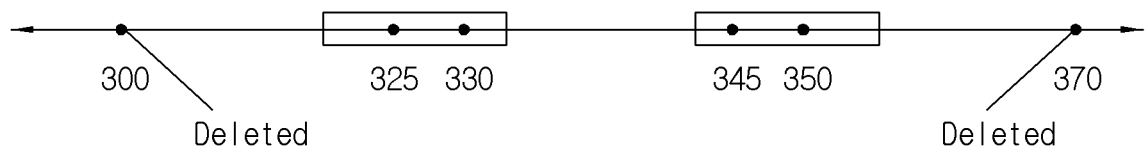

FIG. 6 has been described as an example where a fixed frequency k is set to 2, that is, two consecutive values among the values of the synchronization dictionary are grouped to perform cell sectionalization. However, when the cell sectionalization is performed by setting the fixed frequency k to 1, each value of the synchronization dictionary may be considered to correspond to a minimum value as well as a maximum value of the group, so that a minimum value of each cell may be a value obtained by subtracting an error value $e_1$ from the synchronization dictionary value, and a maximum value of each cell may be a value obtained by adding an error value $e_2$ to the synchronization dictionary value.

In the grouping process, as k increases, the cell size may become larger, and the error may be increased accordingly. When the cell sectionalization is performed, it is preferable to prevent the error from being increased by setting a maximum cell size $C_{max}$ so as to exclude a value from the grouping when the cell size becomes larger than the maximum cell size in a case of performing the grouping in the unit of consecutive k.

An upper portion of FIG. 6c shows a result that a size of a cell is not optimized when two consecutive values are defined as the cell, and a lower portion of FIG. 6c shows a result of performing cell sectionalization by applying the maximum cell size ($C_{max}$=10) to optimize the size of the cell.

The synchronization attribute refers to an attribute formed based on section information of the cell formed as described above, that is, the starting value and the end value obtained by the cell sectionalization, and may be an attribute assigned to an anonymous data set so as to be used to combine anonymous data.

The synchronization target attribute value, which is the original personal identification attribute, may have a very high personal re-identification risk in that a person and an attribute value correspond to each other one-to-one, and the synchronization dictionary value may also have a high personal re-identification risk because the eigenfunction is a one-to-one correspondence function.

Meanwhile, the synchronization attribute has an attribute value in which all personal identification attribute values of an original are removed, error values are randomly added, and thus there is no possibility of personal re-identification, so that an anonymous data set to which the synchronization attribute is assigned to substitute for an original personal identification attribute may be freely distributed to an outside without fear of leakage of personal information, and a plurality of distributed anonymous data sets may be combined with each other based on the synchronization attribute so as to be used for statistical analysis and the like.

Figure 7A:
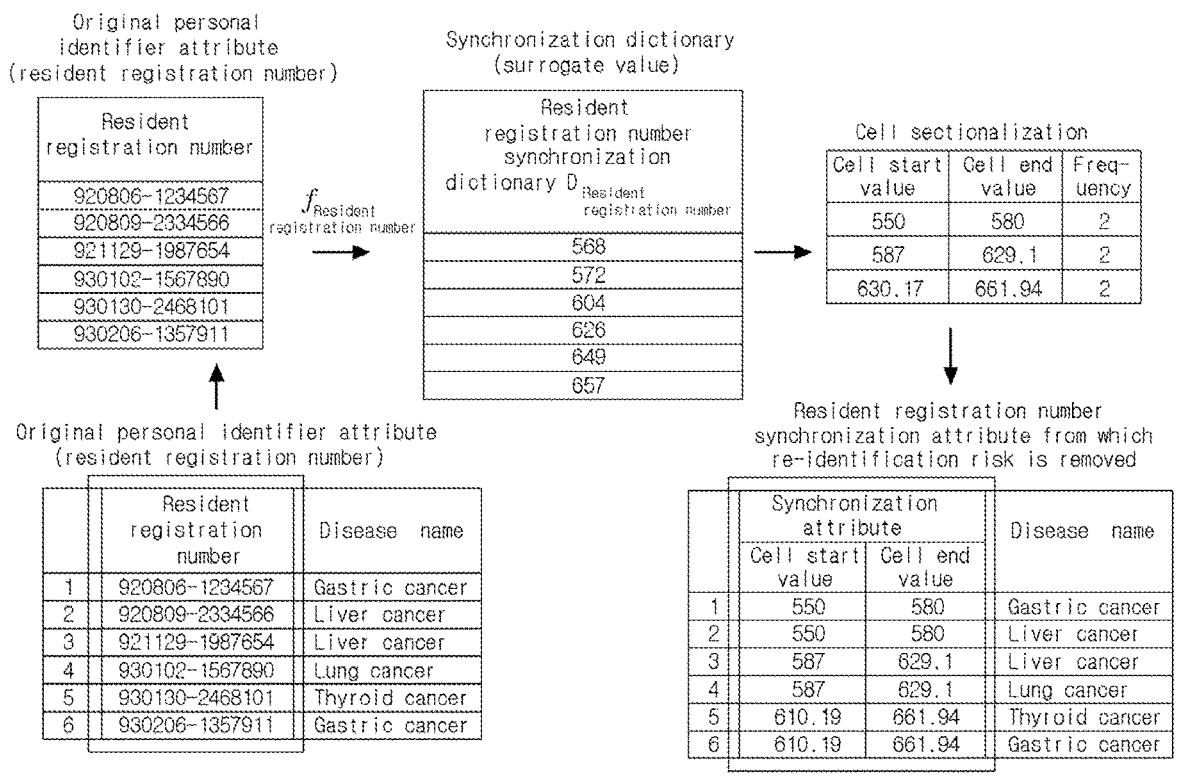
FIG. 7a is a view illustrating cell sectionalization and synchronization attribute generation based on the individual synchronization dictionary.

As described above, the synchronization dictionary applied to the generation of the synchronization attribute may be classified into the individual synchronization dictionary and the local/global synchronization dictionaries. FIG. 7a is a view illustrating a process of generating a synchronization attribute by performing the cell sectionalization based on the individual synchronization dictionary (k=2) and a result thereof, and FIG. 7b is a view illustrating a process of generating a synchronization attribute by performing the cell sectionalization based on the local synchronization dictionary (k=2) and a result thereof.

When the local synchronization dictionary is applied, the synchronization attribute may be generated after performing the cell sectionalization based on a new local synchronization dictionary (union) in which an individual synchronization dictionary extracted from a synchronization target attribute of a corresponding data set is included in an existing local synchronization dictionary having the same type of attribute.

When the local synchronization dictionary is applied, sectionalization may be performed based on more synchronization dictionary values as compared with the individual synchronization dictionary in the cell sectionalization process, so that error values added when defining each cell may be reduced. In addition, an effective frequency of each cell may be reduced while ensuring re-identification impossibility, so that the combination accuracy may be increased.

Figure 7B:
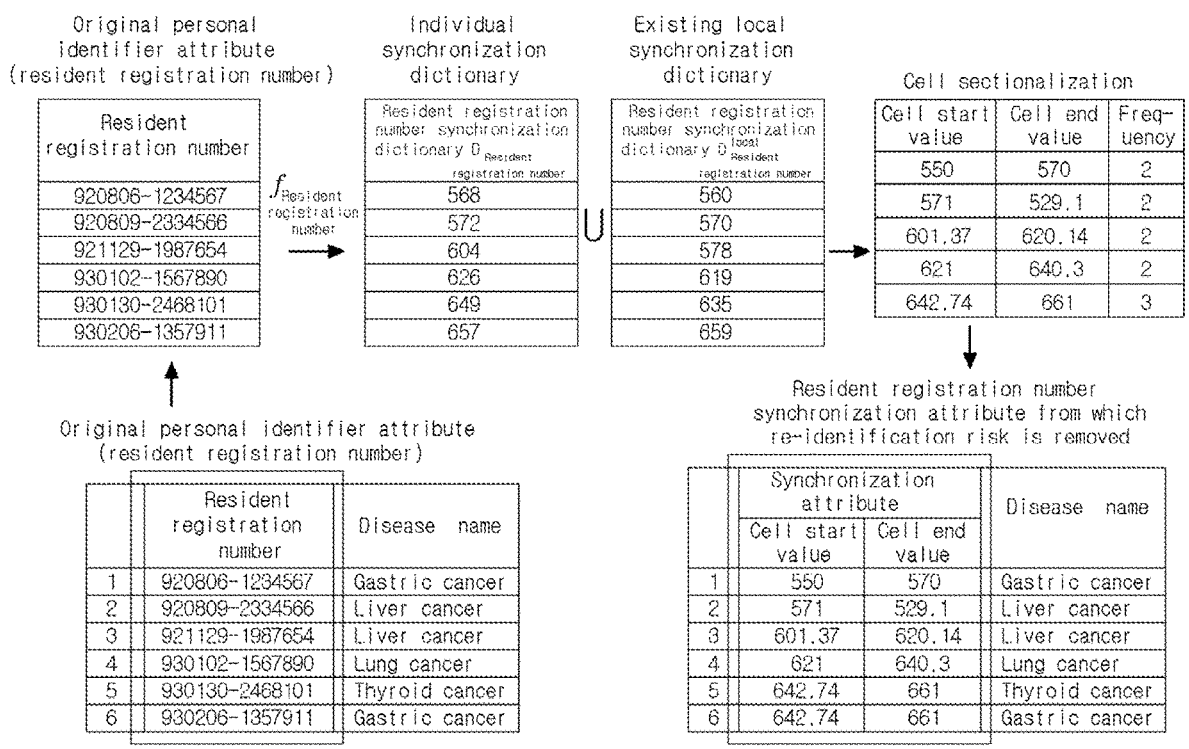
FIG. 7b is a view illustrating the cell sectionalization and the synchronization attribute generation based on the local synchronization dictionary.

FIG. 7c is a view showing cell sectionalization results in the processes of generating the synchronization attribute of FIGS. 7a and 7b, respectively. In the case of using the individual synchronization dictionary, it is found that two values of a synchronization dictionary A are defined in one cell, so that an error value may be relatively large, and the accuracy may be low. In the case of using the local synchronization dictionary, it is found that one or two values of A are defined in one cell, so that an error may be optimized and added as compared with the case where the individual synchronization dictionary is applied, and thus the accuracy may be high.

The scheme of using the global synchronization dictionary is the same as the scheme of using the local synchronization dictionary. However, since the number of mutually different dictionary values of the global synchronization dictionary may be much greater than the number of mutually different dictionary values of the local synchronization dictionary, a refined definition of a cell may be provided, so that a size of the error may be reduced when the global synchronization dictionary is used.

As previously defined, the synchronization attribute refers to an attribute used when combining the anonymous data sets instead of the combination target personal identification attribute of the original personal identification data set. Information on start and end values of the sectionalized cell may be used when combining the anonymous data sets, and the information on the start and end values of the sectionalized cell may be stored in the synchronization attribute.

However, when storing a synchronization attribute value of the anonymous data set, it is preferable to combine the start value and the end value to store a combination result as a single data value, and separate the information on the start value and end value from the data value when combining the anonymous data sets to use a separation result for the combination, rather than storing each of the start and end values of a cell section as a data value of the synchronization attribute.

For example, a value obtained by concatenating the start value and the end value, which are two values of the cell section, may be applied as the synchronization attribute value. The synchronization attribute may have information on the start value and the end value of the sectionalized cell, and may have any form that allows the start and end values to be separated.

The 'synchronization attribute having the value obtained by concatenating the start value and the end value of the cell section' exemplified above is the most typical form of the synchronization attribute and thus referred to as an 'anonymous identifier'. Hereinafter, in the description related to the synchronization attribute, for convenience of description, the 'anonymous identifier' will be described as an example, in which the 'anonymous identifier' is a synonym concept substituting for the 'synchronization attribute'.

Figure 8:
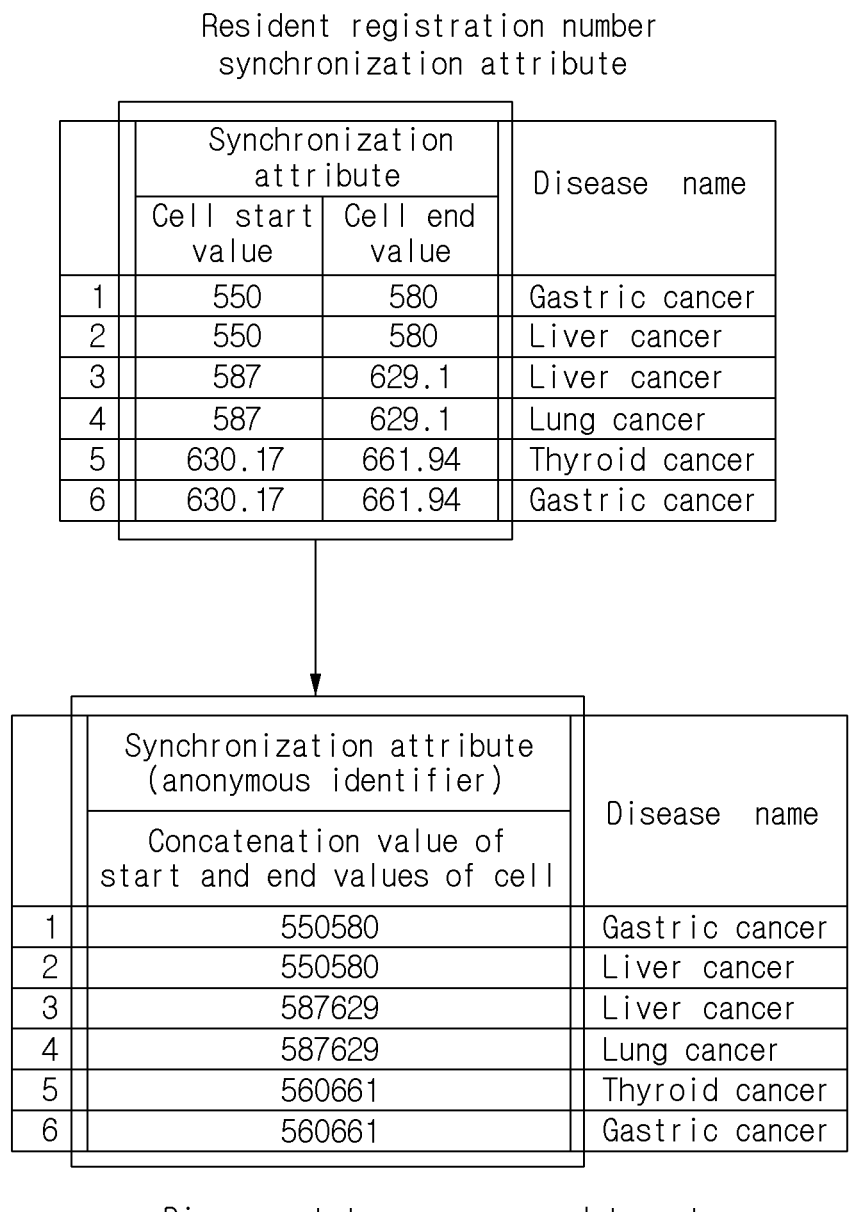
FIG. 8 is a view illustrating an anonymous identifier that is a form of a synchronization attribute.

FIG. 8 shows an example in which the start value and the end value of the cell of a resident registration number synchronization attribute of a disease status anonymous data set of FIG. 6a are concatenated to combine the start value and the end value into one data, and a combination result is stored as a synchronization attribute, that is, a data value of an anonymous identifier. A process of rounding off or rounding down below the decimal point may be performed.

Meanwhile, the anonymous identifier, that is, the synchronization attribute may be generated as a single anonymous identifier that is generated by allowing only one personal identification attribute value to correspond to one cell, and multiple anonymous identifiers that are generated by allowing a plurality of personal identification attribute values to correspond to one cell.

Figure 9A:
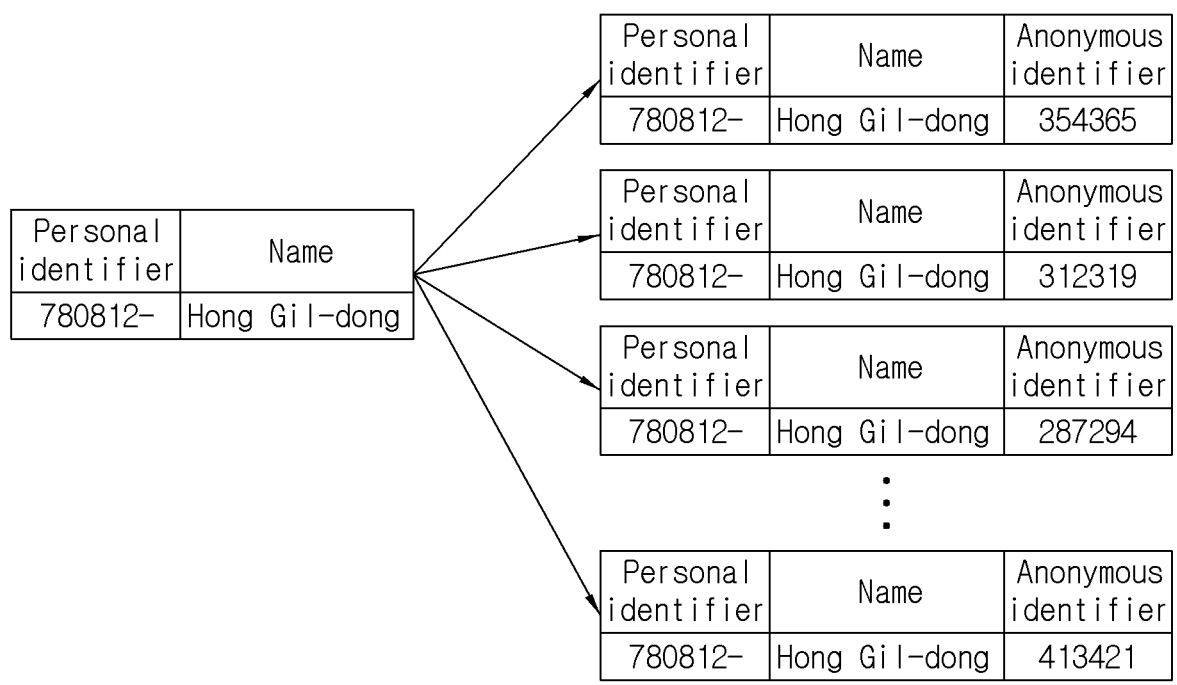
FIG. 9a is a view illustrating a single anonymous identifier.

As illustrated in FIG. 9a, in the case of the single anonymous identifier, a plurality of mutually different anonymous identifiers may be generated for the same person to have relation of person:anonymous identifier=1:n, whereas each of the anonymous identifiers may correspond to only one person.

Figure 9B:
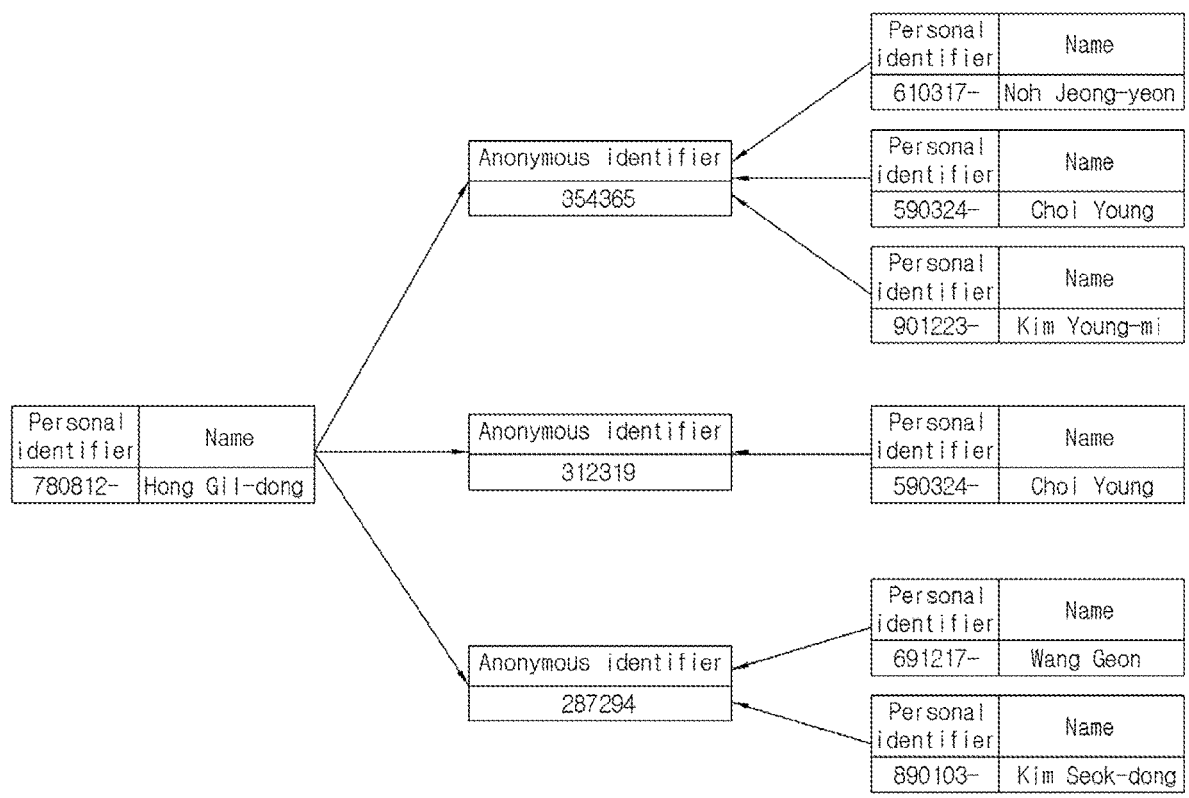
FIG. 9b is a view illustrating multiple anonymous identifiers.

Meanwhile, as illustrated in FIG. 9b, in the case of the multiple anonymous identifiers, one person may correspond to a plurality of anonymous identifier values (person:anonymous identifier value=1:n) while one anonymous identifier value may correspond to a plurality of persons (anonymous identifier value:person=1:m). When the maximum number of personal identifiers allowed in one cell is k, the multiple anonymous identifiers are defined as 'k-multiple anonymous identifiers'.

As a k value increases, anonymity of the k-multiple anonymous identifiers may become higher. In addition, the single anonymous identifier may correspond to a 1-multiple anonymous identifier, and may have anonymity lower than the anonymity of the multiple anonymous identifiers.

In the above description, for convenience of description and understanding, a case where all personal identifiers in the original data set are different from each other has been described as an example. However, the anonymous identifier of the present invention may be naturally applied even when one personal identifier is exhibited multiple times in the original data set.

When one personal identifier is exhibited multiple times in the original data set, the cell sectionalization may be separately performed with reference to the synchronization table for each duplicate records of the personal identifier in the original data set. Accordingly, mutually different error values may be added to synchronization table values corresponding to the same personal identifier, so that a plurality of anonymous identifier values different from each other may exist for the same person.

Figure 10A:
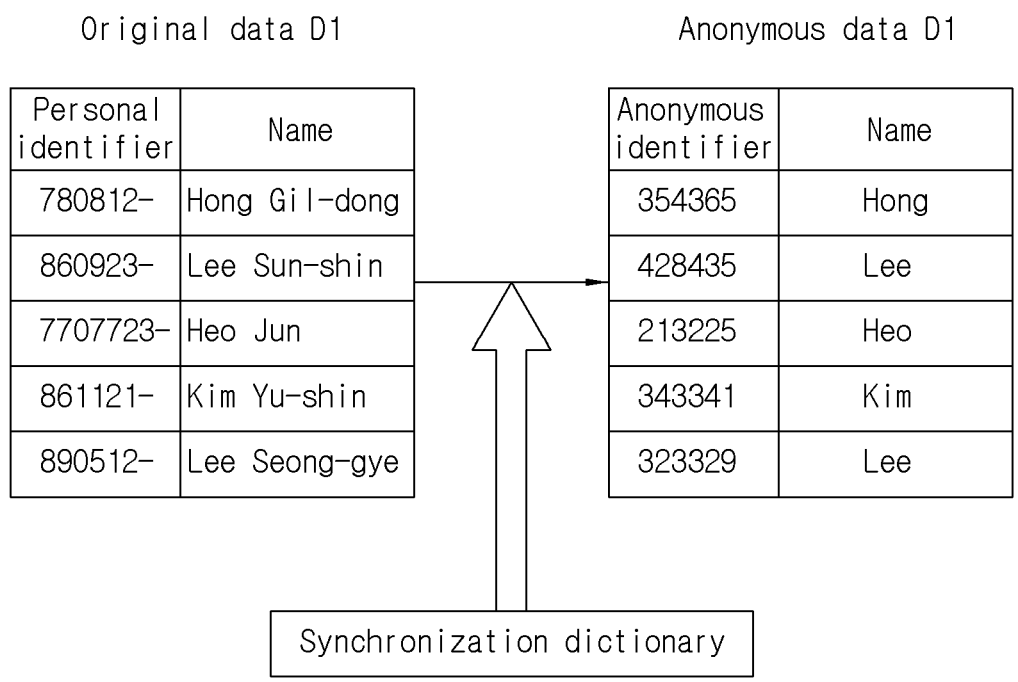
FIG. 10a is a view illustrating an arrangement generation scheme for the anonymous identifier.
Figure 10B:
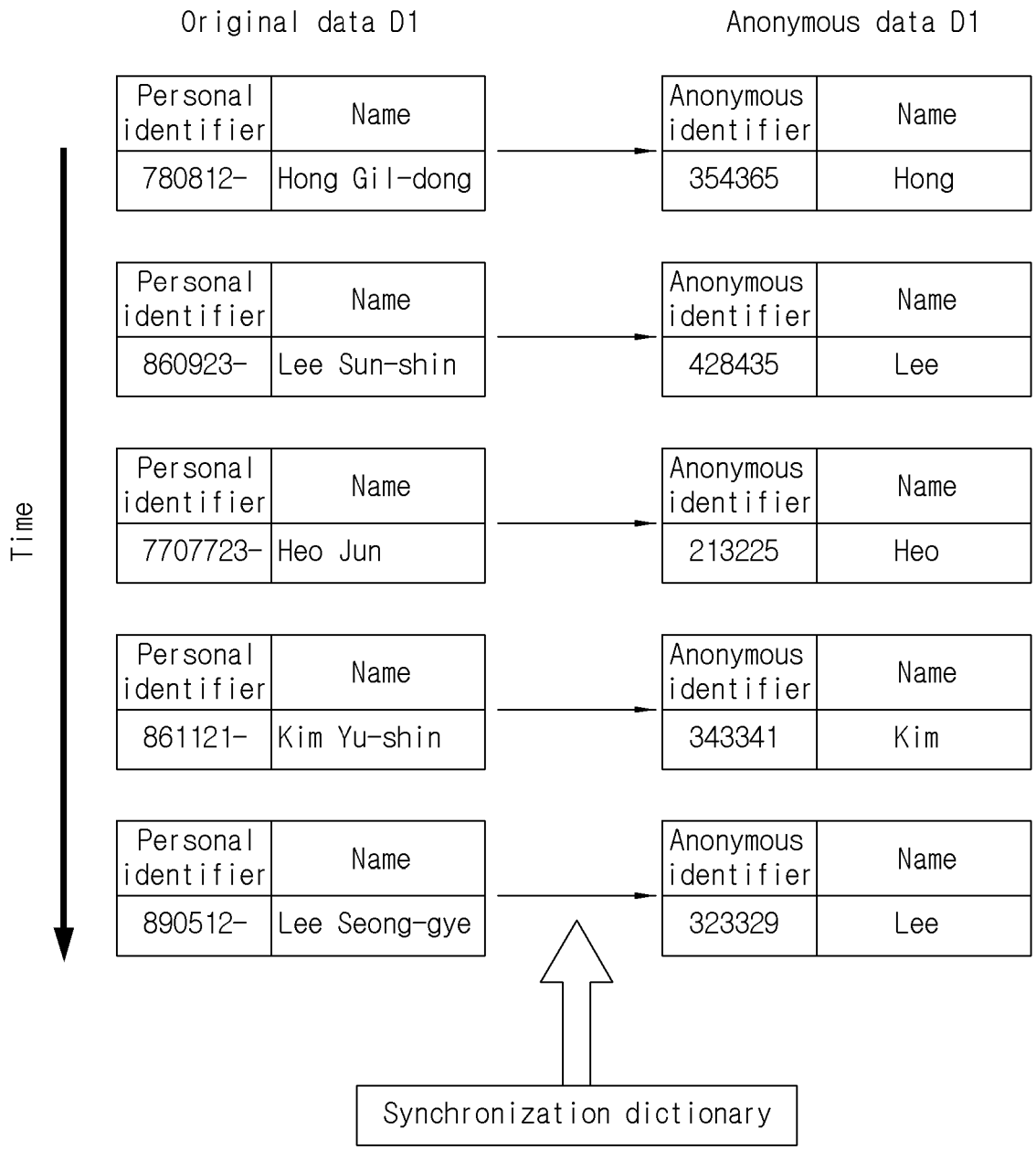
FIG. 10b is a view illustrating a unit generation scheme for the anonymous identifier.

Meanwhile, a process of generating an anonymous identifier may be classified, depending on an operation environment thereof, into an arrangement generation scheme of generating anonymous identifiers for a plurality of personal identifiers at once as illustrated in FIG. 10a, and a unit generation scheme of generating one personal identifier as an anonymous identifier at a time as illustrated in FIG. 10b. In a real-time data stream environment in which processing is performed in a unit of one personal record, it is preferable to apply the unit generation scheme.

Next, the synchronization operation will be described in detail.

When two anonymous data sets generated in mutually different safe spaces and distributed to the outside have the same synchronization attribute (anonymous identifier), an operation of combining the two data sets based on a common anonymous identifier is defined as a 'synchronization operation' or 'anonymous matching'.

One or more synchronization attributed in an anonymous data set are collectively defined as a 'synchronization map' of the data set. The synchronization map existing in the anonymous data set may include cell section information to which an arbitrary error is added, not the original personal identification attribute value, so that there is no personal identifier value serving as a reference when combining personal records.

In a case of a general personal identifier that allows only one value for one person, such as the resident registration number, two identifiers may be compared to each other by an existing numeric or character comparison operator to determine whether the two identifiers have the same value without defining a separate operator for a matching operation to determine whether the two identifiers correspond the same person.

However, the anonymous identifier according to the present invention may have a plurality of anonymous identifier values different from each other even for the same person, so that the same person may not be found by simply matching numbers or characters.

Therefore, according to the present invention, in order to determine whether two anonymous identifiers generated by applying the same eigenfunction f for the same personal identifier domain correspond to the same person, an 'anonymous matching operator' defined as follows may be applied, in which the anonymous matching operator is denoted by '#'.

Anonymous matching operation a #b=(true, C(a, b)) or (false, 0)

Anonymous identifier a=(a.s, a.e), where a.s is a cell start value of a, and a.e is a cell end value of a Anonymous identifier b=(b.s, b.e), where b.s is a cell start value of b, and b.e is a cell end value of b C(a, b)=synchronization validity reliability In other words, the anonymous matching operator may process as a matching success when there is an overlapping portion in cells of the two anonymous identifiers, and may provide a synchronization validity reliability value representing an overlapping degree of the two cells (validity reliability that the anonymous identifiers a and b represent the same person) as a result of an anonymous combination.

If there is no overlapping area in cell sections of the anonymous identifiers a and b, a result value of the anonymous matching may be false, and at this time, the synchronization validity reliability value may be 0.

Meanwhile, when there is an overlapping area in the cell sections of the anonymous identifiers a and b, a result may be true, which means that probability of the two anonymous identifiers representing the same person may become higher as the synchronization validity reliability value increases.

The synchronization validity reliability value may be a value greater than 0 and less than 1.

A user may preset a minimum synchronization validity reliability threshold $C_{min}$, so that an anonymous matching success result having reliability less than the threshold may be regarded as a failure so as to be excluded from the combination.

As described above, the synchronization validity reliability refers to an indicator representing combination validity of a record pair existing in the two anonymous data sets, that is, an indicator representing reliability of each combination. The synchronization validity reliability may be calculated as follows.

Assuming that there are synchronization maps $M_A$ and $M_B$ generated for the same original identifier from two original data sets A and B, and there are a cell $C_i^{MA}$ of $M_A$ ($1 \leq i \leq n$ is the number of cells of $M_A$) and a cell $C_j^{MB}$ of $M_B$ ($1 \leq j \leq m$, M is the number of cells of $M_B$), the following process may be performed for $C_i$.

1) Search for the cell $C_j^{MB}$ having a section overlapping a section of the cell $C_i^{MA}$.

2) Perform record combination by obtaining a product set of records corresponding to the two cells for the cell $C_j^{MB}$ having the section overlapping the section of the cell $C_i^{MA}$.

3) Designate synchronization validity reliability as a reliability value for a product set combination result record by calculating the synchronization validity reliability.

The synchronization validity reliability $w(C_i^{MA}, C_j^{MB})$ of the cell $C_i^{MA}$ and the cell $C_j^{MB}$ may be calculated as follows.

$$w(C_i^{MA}, C_j^{MB}) = (\text{size}(C_i^{MA} \cap C_j^{MB})/\text{size}(C_i^{MA})) * (\text{size}(C_i^{MA} \cap C_j^{MB})/\text{size}(C_j^{MA}))$$

Figure 11A:
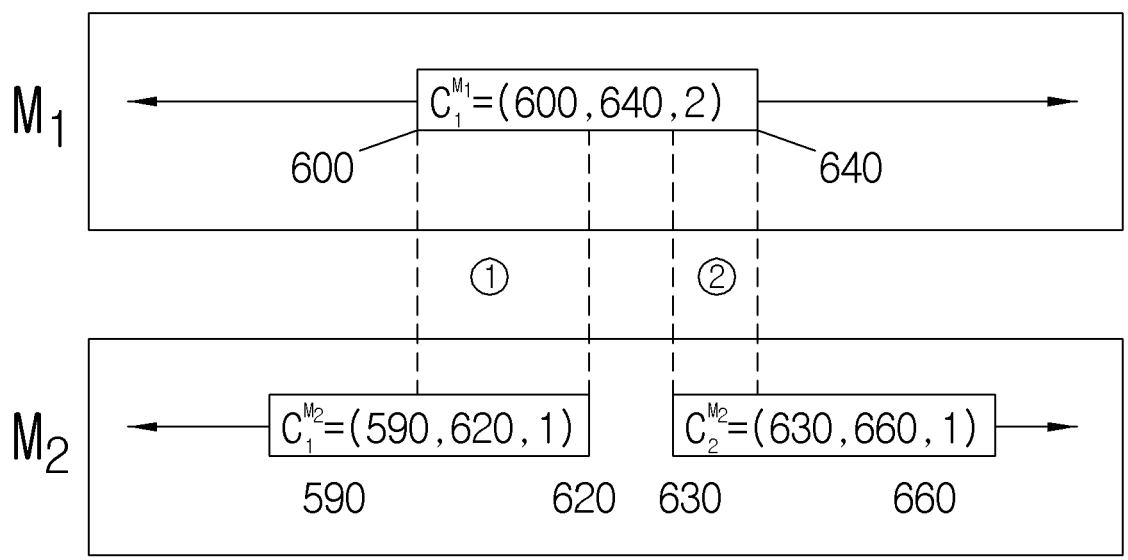
FIG. 11a is a view illustrating an overlapping section of two anonymous data.

In order for the combination of the record of the cell $C_i^{MA}$ and the record of the cell $C_j^{MB}$ to be an actual valid record combination, an actual record of the same person has to exist within the same section, so that two records may exist in an overlapping section as illustrated in FIG. 11a. As described above, a probability value that the two records exist in the overlapping section is defined as 'synchronization validity reliability'.

FIG. 11b is a view illustrating the anonymous combination of the two data sets by using the synchronization validity reliability and a reliability calculation result, and shows that all records are combined for an overlapping cell pair, and synchronization validity reliability of the record combination is calculated and added.

The synchronization validity reliability of the two overlapping sections in synchronization attributes of the two data sets of FIG. 11b may be calculated as follows.

$$w(C_1^{M1}, C_2^{M2}) = (\text{size}(C_1^{M1} \cap C_1^{M2})/\text{size}(C_1^{M1})) * (\text{size}(C_1^{M1} \cap C_1^{M2})/\text{size}(C_2^{M2})) = (20/40)*(20/30) = 1/3 = 0.333$$

$$w(C_1^{M1}, C_2^{M2}) = (\text{size}(C_1^{M1} \cap C_2^{M2})/\text{size}(C_i^{M1})) * (\text{size}(C_1^{M1} \cap C_2^{M2})/\text{size}(C_2^{M2})) = (10/40)*(10/30) = 1/12 = 0.083$$

As described above, the synchronization operation (anonymous matching) may include an operation of searching whether a person having a specific anonymous identifier exists in a given synchronization map (anonymous identifier set), and an operation of connecting the records of two anonymous identifier sets to the same person.

In this case, a scheme of comparing ranges of all anonymous identifier pairs, that is, a simple range comparison scheme may also be possible, but the simple range comparison scheme may be very inefficient. Therefore, in order to effectively perform an anonymous identifier matching operation, it is preferable to apply a discretization anonymous matching scheme that will be described as follows.

Figure 12:
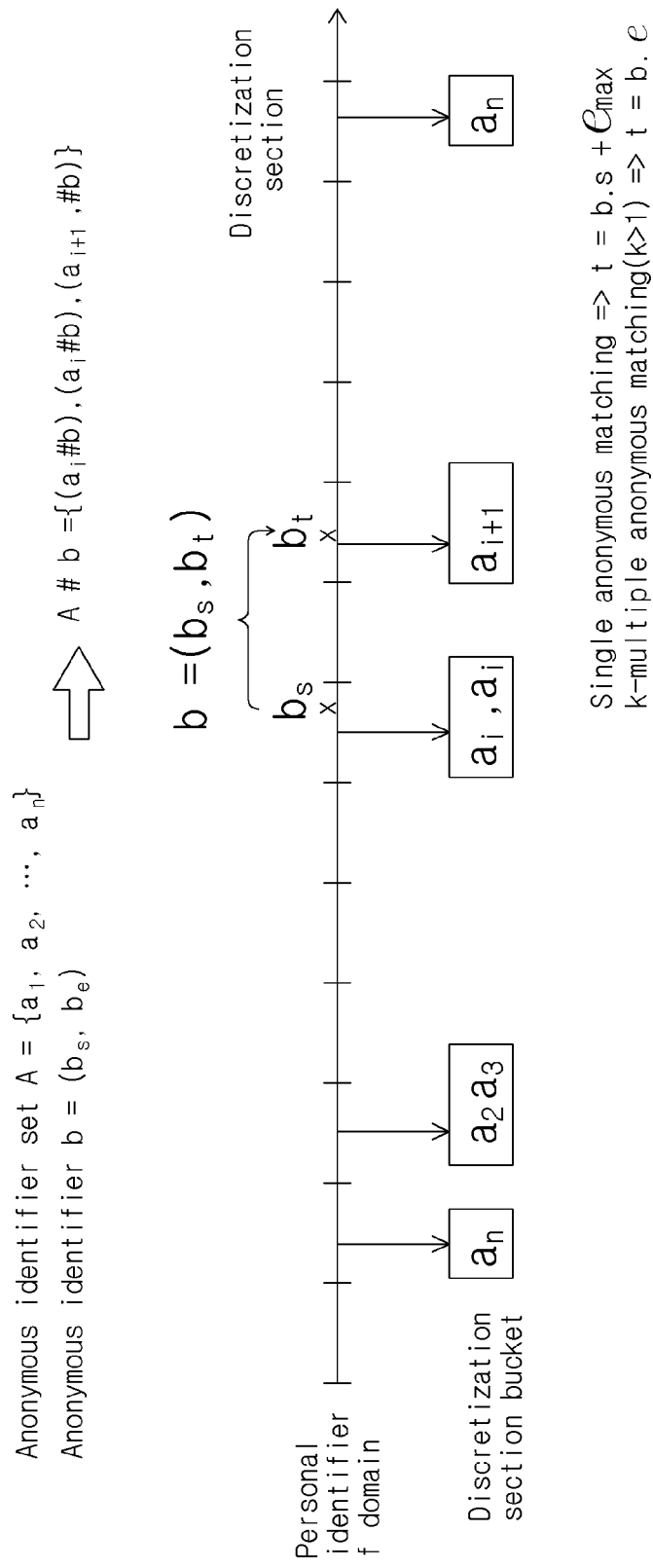
FIG. 12 is a view illustrating discretization anonymous matching.

FIG. 12 is a view illustrating a discretization anonymous matching operation (A #b) between an anonymous identifier set A having a plurality of anonymous identifiers and one anonymous identifier b. First, an entire domain of a synchronization attribute value f may be discretized in a unit of a fixed size to initialize and generate an empty anonymous identifier bucket in each of discretization sections.

In this case, when both A and b are single anonymous identifiers, a personal identifier surrogate value corresponding to a cell may always exist within a range (s, s+$e_{max}$) from a cell start value s to the maximum error $e_{max}$. Therefore, for each anonymous identifier a, in the anonymous identifier set A, $a_i$ may be inserted into buckets from a discretization section including a value of a start point $a_i$.s of the cell of the anonymous identifier $a_i$ to a discretization section including a value of $a_i$+$e_1$, that is, in consecutive discretization sections corresponding to a section ($a_i$.s, $e_{max}$).

Thereafter, for a single anonymous identifier b that is an anonymous combined target, while searching for a bucket of the discretization section from a discretization section of a start point b.s of the cell of the anonymous identifier b, an operation of $a_i$#b may be performed when $a_i$ exists in the bucket to return a result of the operation of $a_i$#b as a result of the anonymous matching operation A #b, and may be terminated.

If there is no $a_i$ in the bucket of the discretization section, the above operation may be repeatedly performed by sequentially inspecting the buckets until the discretization section of b.s+$e_{max}$, that is, in the discretization section corresponding to a range of (b.s, b.s+$e_{max}$). If there is no $a_i$ in all the buckets until the last discretization section, the anonymous matching operation A #b may return false and may be terminated.

Meanwhile, in a case of anonymous matching among k-multiple anonymous identifiers (k>1), multiple personal identifier surrogate values may exist in one cell, and a range of the multiple personal identifier surrogate values may be all sections of the cell.

Therefore, in a case where A and b are k-multiple anonymous identifiers (k>1), first, for each anonymous identifier $a_i$ in the anonymous identifier set A, $a_i$ may be inserted into the buckets in all discretization sections from the discretization section including the value of the start point $a_i.s$ of the cell of $a_i$ to a discretization section corresponding to an end point $a_i.e$ of the cell of $a_i$.

Thereafter, for the anonymous identifier b, while searching for the bucket of the discretization section from the discretization section of the start point b.s of the cell of b, the operation of $a_i\#b$ may be performed when $a_i$ exists in the bucket to return the result of the operation of $a_i\#b$ as the result of A #b, and may be terminated. In addition, if there is no bucket having $a_i$ until a discretization section corresponding to b.e, the anonymous matching operation A #b may return a false and may be terminated.

Although FIG. 12 has illustrated the discretization anonymous matching operation (A #b) between the anonymous identifier set A and the one anonymous identifier b for convenience of description, an anonymous matching operation (A #B) between two anonymous identifier sets A and B may also be performed in a similar manner.

For example, only discretization sections from the cell start value to the maximum error $e_{max}$ may be compared when both A and B are single anonymous identifiers, and all discretization sections corresponding to an entire cell section may be compared in the case of k-anonymous identifiers (k>1).

First, anonymous identifiers $a_i$ may be sequentially inserted into the bucket in all discretization sections corresponding to a search range of each of the anonymous identifiers $a_i$ of A. In the same way, for each anonymous identifier $b_j$ of an anonymous identifier set B, when the anonymous identifier $a_i$ of A exists in a bucket of each section from a discretization section corresponding to a start point of a search range of $b_j$, a result of performing an operation of $a_i\#b_j$ may be returned, and the same operation may be performed for the next anonymous identifier $b_{j+1}$ of the anonymous identifier set B. When an anonymous identifier no longer exists in B, A #B may be terminated.

Meanwhile, as a scheme of combining two anonymous identifier sets, a unit combination scheme, an arrangement combination scheme, and a mixed combination scheme may be applied according to an operation environment.

Figure 13A:
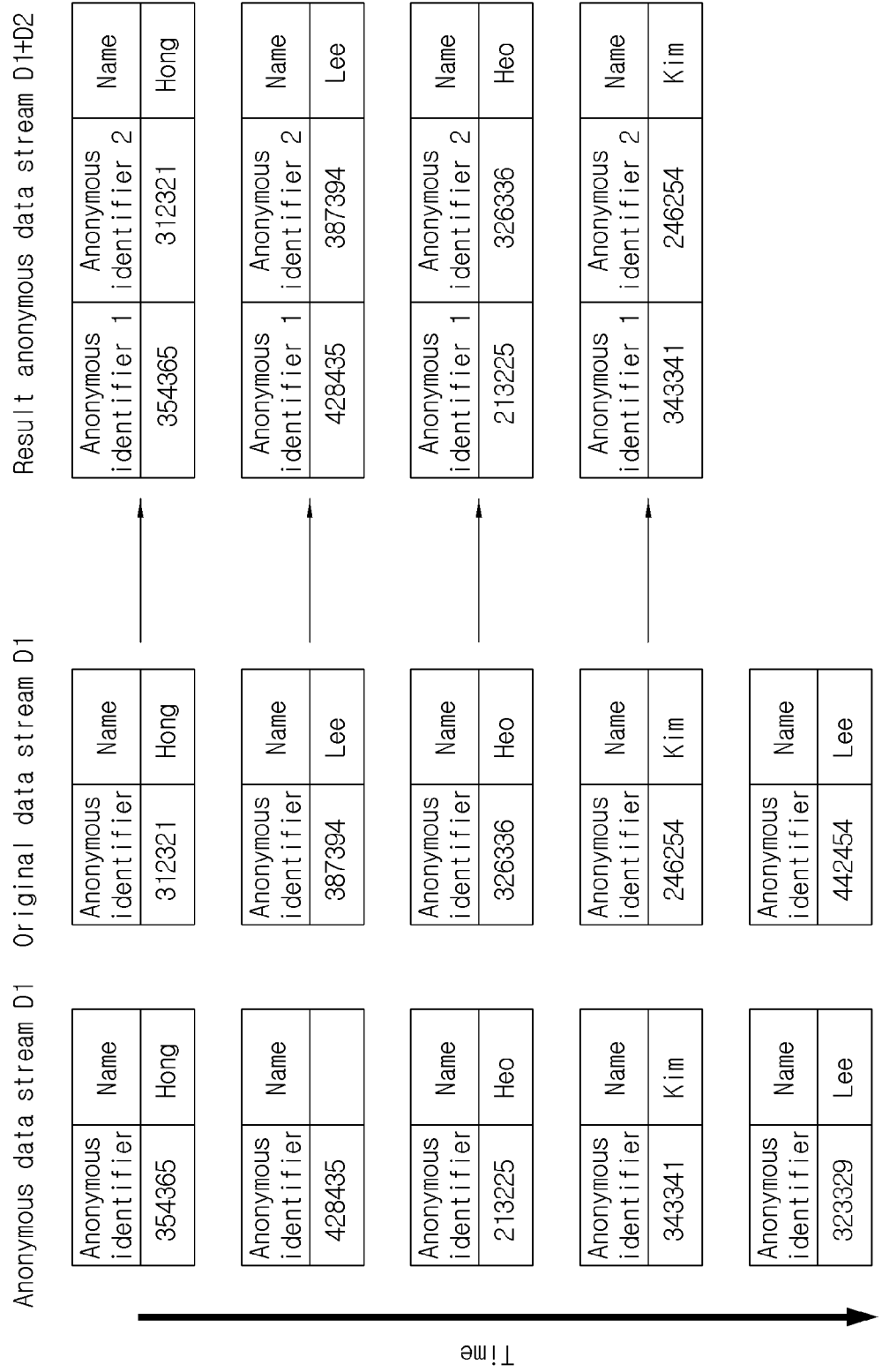
FIG. 13a is a view illustrating a unit combination scheme for the anonymous identifier.

As illustrated in FIG. 13a, the unit combination scheme refers to a scheme of repeatedly performing an anonymous matching operation (a #b) in a unit of a pair of records a and b of two original data sets A and B.

The above scheme may be suitable for a data stream environment where new records are constantly generated, and may be a scheme of generating a combined result data stream by generating anonymous identifiers one by one for each newly generated record through the unit generation scheme, and performing the anonymous matching operation (a #b) on the anonymous identifiers a and b for each record of two anonymous data streams generated accordingly.

As illustrated in FIG. 13b, the arrangement combination scheme refers to a scheme of performing the anonymous matching operation (A #B) on anonymous identifier sets A and B of two anonymous data sets by collecting anonymous identifiers of personal identifiers in the two original data sets.

Figure 13C:
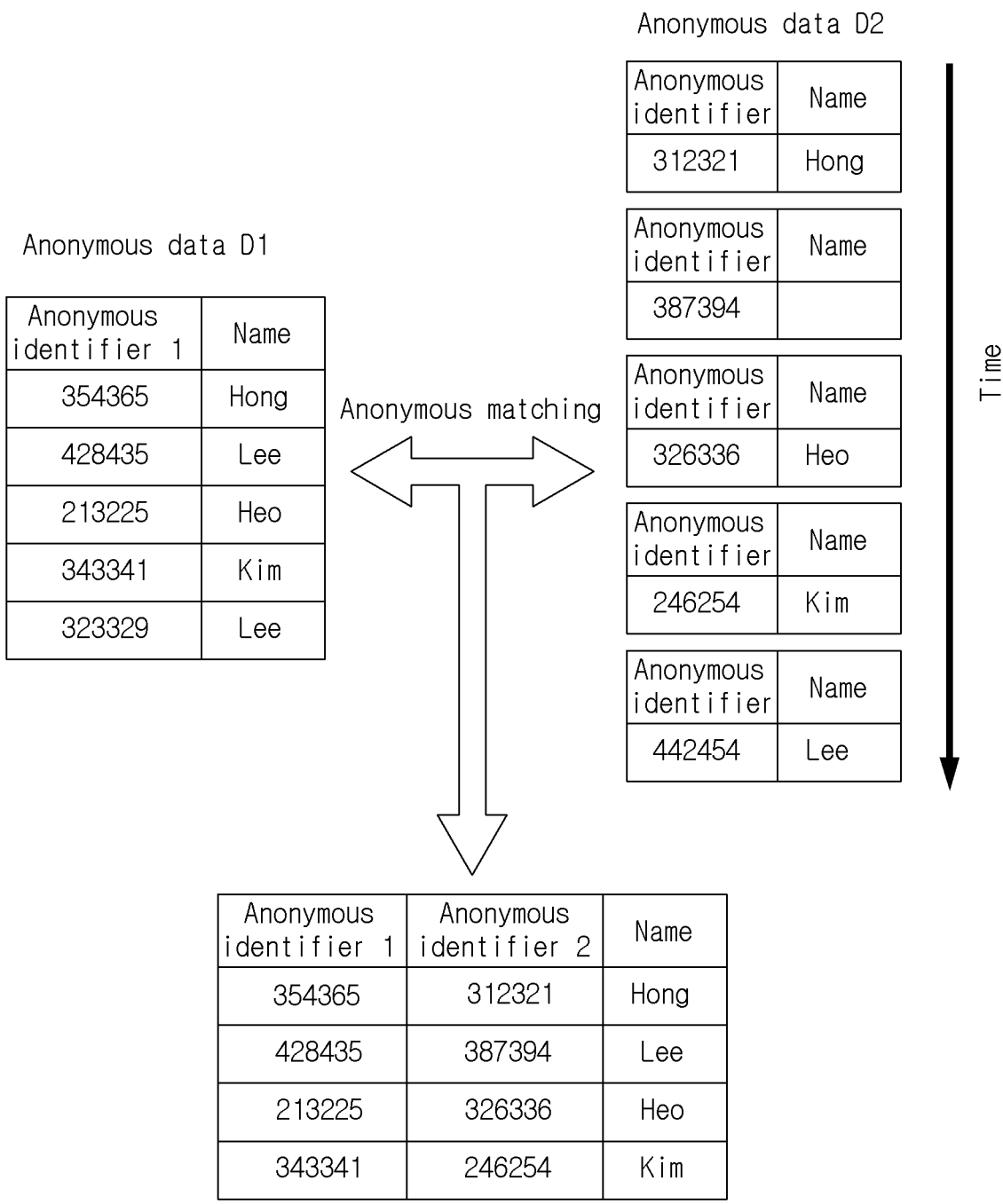
FIG. 13c is a view illustrating a mixed combination scheme for the anonymous identifier.

Finally, as illustrated in FIG. 13c, the mixed combination scheme refers to a scheme performed in an environment in which one of the two original data sets is an anonymous identifier set A obtained by collect anonymous identifiers, and the remaining one is an anonymous identifier b generated by the unit generation scheme, and may be a scheme of combining the anonymous identifier set A and the anonymous identifier b.

As described above, the anonymous matching operator may be applied to determine whether two anonymous identifiers correspond to the same person. Depending on an amount of errors added in the process of generating the anonymous identifier, anonymous identifiers generated for the same person may be determined not to be for the same person, or different persons may be incorrectly determined as the same person.

Since a frequency of occurrence of such errors depends on an maximum error value of random errors, errors in a result of anonymous matching between the anonymous identifiers may be minimized when errors in generating anonymous identifiers are minimized.

Therefore, when an anonymous identifier is generated for the original data set, it is preferable to verify anonymous identifier generation conformity, and to regenerate the anonymous identifiers to satisfy minimum conformity if necessary.

Hereinafter, a scheme of determining generation conformity of an anonymous identifier and a scheme of regenerating the anonymous identifier will be described.

First, a scheme of determining generation conformity of an anonymous identifier when all personal identifiers in the original data set are different from each other will be described.

In a case where an anonymous identifier is generated from an original personal identifier data set D, in which the total number of records in the data set D is defined as $|D|$, the number of mutually different personal identifiers in the data set D is defined as $|P_D|$, and a personalization ratio PR(D) of D is defined as $|P_D|/|D|$, the personalization ratio PR(D) of D may be 1 when all the personal identifiers in an original data set D have mutually different values.

After an anonymous identifier is generated for each personal identifier of the original, in order to determine the generation conformity, anonymous identifier groups corresponding to personal identifiers may be searched for the generated anonymous data.

An anonymous identifier corresponding to each personal identifier may be found by performing information-aggregating anonymous data combination that will be described below.

Anonymous identifiers in which a result of the anonymous matching operation (#) is determined to be true may be grouped into one cluster based on the above-described minimum synchronization validity reliability threshold $C_{min}$. In other words, a condition that all results of anonymous matching between all anonymous identifier pairs in one cluster are true for the threshold $C_{min}$ may be satisfied.

The one cluster grouped as described above may correspond to anonymous identifiers corresponding to one personal identifier in the original. After all clusters are obtained, a cluster set G(D) may be arranged according to a size of each of the clusters.

In an anonymous identifier cluster set G(D) generated for the original data set D, when number of clusters having one anonymous identifier=|G1| number of clusters having two anonymous identifiers=|G2| number of clusters having three anonymous identifiers=|G3|

..., and number of clusters having v anonymous identifiers=|Gv|, the total cluster number |G(D)| in G(D) may be |G1|+|G2|+|G3|+ ... +|Gv|, and the total generated anonymous identifier number |A| may be |G1|+2|G2|+3|G3|+ ... +v|Gv|.

Based on the minimum synchronization validity reliability threshold $C_{min}$, when an operation of generating an anonymous identifier set $A(P_D)$ corresponding to a personal identifier set $P_D$ existing in the data set D is defined as $M(P_D, A(P_D))$, and a degree at which an anonymous identifier corresponds one-to-one with one personal identifier is defined as anonymization conformity $EA(M(P_D, A(P_D)))$ of the operation $M(P_D, A(P_D))$, the anonymization conformity may be $|G1|/|P_D|$.

If $|G1|=|P_D|$, the anonymization conformity may be 1, which represents that the generation conformity of the anonymous identifier is perfectly ensured.

When the anonymization conformity is less than 1, it may mean that ranges of anonymous identifiers generated for personal identifiers of at least two persons overlap each other so that the anonymous identifier has been generated to incorrectly correspond to the personal identifier, and an error rate may be $1-EA(M(P_D, A(P_D)))$.

The anonymous identifiers generated as errors may be all anonymous identifiers existing in the cluster having at least two single anonymous identifiers. Therefore, the total number $T_A$ of single anonymous identifiers generated as errors may be $|G(D)|-|G1|$, and an error rate $ET_A$ may be $(|G(D)|-|G1|)/|G(D)|$.

When a result of an anonymous identifier generation operation $M(P_D, A(P_D))$ is less than or equal to a minimum allowable threshold $EA_{min}$ of the anonymization conformity, the anonymous identifiers generated as errors may be regenerated and corrected as follows.

In the previous example, since the anonymous identifiers existing in clusters G2 to Gv are generated incorrectly, a new anonymous identifier may be regenerated for the personal identifiers corresponding to the anonymous identifiers of the clusters, such that the anonymous identifier may be regenerated until a discretization section of a newly generated anonymous identifier cell does not overlap a range of the cluster G1 that is correctly generated.

In order to reduce the number of repetitions, the maximum error value e may be reduced to perform a regeneration operation.

In general, after one anonymous identifier is left in the cluster of Gk (1<k≤v) and the remaining k−1 anonymous identifiers are deleted, while a new anonymous identifier are generated for each of k−1 personal identifiers corresponding to the deleted anonymous identifiers, the generation may be repeatedly performed until the new anonymous identifier does not belong to the existing cluster and forms an independent cluster, such that the anonymization conformity $EA((P_D, A(P_D)))$ may be reverified whenever a new cluster is generated, and the generation may be terminated when the minimum conformity is satisfied.

Next, a process of determining conformity and regenerating an anonymous identifier when not all personal identifiers existing in the original data set are mutually different values, and one personal identifier is exhibited multiple times in the original data set will be described.

When one personal identifier is exhibited multiple times in the original data set, an anonymous identifier has to be generated for the same person by the number of duplicates of the personal identifier, so that personal identifier duplication characteristics of the original data set may be extracted as follows.

Total number of records in the original data set D=|D| number of records in which the personal identifier is duplicated one time=P1 number of records in which the personal identifier is duplicated two times=P2 number of records in which the personal identifier is duplicated three times=P3

..., and number of records in which the personal identifier is duplicated w times=Pw In this case, the total person number $|P_D|$ may be P1+P2+ ... +Pw, the total record number |D| may be P1+2P2+3P3+ ... +wPw, and the generated single anonymous identifiers may ensure perfect conformity when the following conditions are satisfied.

$$|PD|=|G1|+|G2|+|G3|+ \ldots +|Gv|$$

where P1=|G1|, P2=|G2|, ..., and Pw=|Gv|

When the anonymization conformity is less than 1, the total number of anonymous identifiers generated as errors may be $(P1-|G1|)+(P2-|G2|)+ \ldots +(Pv-|Gv|)$.

The scheme of regenerating and correcting the anonymous identifiers generated as the errors may be similar to the scheme described above, but the correction may be performed for each cluster as follows.

Each cluster may be inspected to determine whether the cluster includes only anonymous identifiers corresponding to the personal identifier of the same person, and when anonymous identifiers corresponding to other persons exist in the cluster, all the anonymous identifiers corresponding to other persons may be deleted.

A new anonymous identifier may be generated for each personal identifier corresponding to the deleted anonymous identifiers, such that the new anonymous identifier may be inspected to determine whether the new anonymous identifier is included in a cluster of a corresponding person, and the generation may be repeatedly performed until the new anonymous identifier is included in the cluster of the corresponding person.

In order to reduce the number of repetitions, the maximum error value e may be reduced.

In this way, the new anonymous identifier may be regenerated for erroneous personal identifiers until a condition of the minimum allowable threshold $EA_{min}$ of the anonymization conformity is satisfied.

Next, the scheme of determining the conformity and regenerating the anonymous identifier in a process of generating k-multiple anonymous identifiers (k>1) for the personal identifier of the original data set will be described.

When all personal identifiers in the original data set are $|P_D|$ mutually different personal identifiers ($|P_D|/|D|=1$), in a case where the individual synchronization dictionary is used, the anonymous identifier may be generated by using only the personal identifiers existing in the original data set, so that one k-anonymous identifier may correspond to k personal identifiers, and $|P_D|/k$ mutually different k-multiple anonymous identifiers may be generated.

When the number of anonymous identifiers that are actually generated is smaller or larger than the above number, it means that an error has occurred, so that the regeneration may be performed to allow the number of anonymous identifiers that are actually generated to correspond to a correct number.

In order to verify the conformity between the k-multiple anonymous identifiers generated when all the personal identifiers in the original data set have mutually different values, the following characteristic information may be extracted from the original data set.

For the anonymous identifier cluster set G(D) generated for the original data set D, number of clusters having one anonymous identifier=|G1|
    number of clusters having two anonymous identifiers=|G2|
    number of clusters having three anonymous identifiers=|G3|
    ..., and
    number of clusters having v anonymous identifiers=|Gv|

In this case, the total cluster number |G(D)| in G(D) may be |G1|+|G2|+|G3|+ ... +|Gm|, and the total generated anonymous identifier number |A| may be |G1|+2|G2|+3|G3|+ ... +v|Gv|.

When k=2, only the cluster G2 may be 2-multiple anonymous identifiers that are correctly generated, and the k-multiple anonymous identifiers correctly generated for a given value of k may be multiple identifiers existing in clusters Gk.

In other words, anonymous identifiers correctly generated by a k-multiple anonymous identifier generation operation M(PD, A(PD)) may be identifiers existing in the cluster Gk, and all anonymous identifiers existing in the remaining clusters may be identifiers that are incorrectly generated.

Based on the minimum synchronization validity reliability threshold $C_{min}$, when an operation of generating a k-multiple anonymous identifier set $Ak(P_D)$ corresponding to the personal identifier set $P_D$ existing in the data set D is defined as $M(P_D, Ak(P_D))$, and a degree at which one of the k-multiple anonymous identifiers (k>1) makes 1:k correspondence with personal identifiers of k persons, that is, the anonymization conformity is defined as $EA(M(P_D, Ak(P_D)))$, the anonymization conformity may be |Gk|/|PD|.

If |Gk|=|PD|/k, the anonymization conformity may be 1, which represents that the generation conformity of the anonymous identifier is perfectly ensured.

When the anonymization conformity is less than 1, it may mean that the k-multiple anonymous identifiers have been incorrectly generated to correspond to personal identifiers of persons that are less than or greater than k, and an error rate may be $1-EA(M(P_D, Ak(P_D)))$.

In the previous example, clusters G1, ..., and G(k−1) may correspond to clusters generated such that the numbers of corresponding personal identifiers are smaller by (k−1), (k−2), ..., and 1, respectively, whereas clusters G(k+1), ..., and Gv may correspond to clusters generated such that the numbers of corresponding personal identifiers are larger by 1, 2, ..., and (v−k), respectively.

Therefore, the total number $T_A$ of k-multiple anonymous identifiers generated as errors may be |G(D)|−|Gk|, and the error rate $ET_A$ may be (|G(D)|−|Gk|)/|G(D)|.

The k-multiple anonymous identifiers generated as errors may be regenerated and corrected as follows.

For the clusters G(k+1) to Gv to which more personal identifiers correspond, the anonymous identifiers may be deleted while leaving only k anonymous identifiers. New k-multiple anonymous identifiers may be generated for the personal identifiers corresponding to the deleted k-multiple anonymous identifiers, respectively.

A discretization section of a newly generated k-multiple anonymous identifier cell may be added to the clusters G1, G2, and G(k−1), and the generation may be repeatedly performed until the number of anonymous identifiers of each of the clusters reaches k.

In order to reduce the number of repetitions, the maximum error value e may be reduced to perform the regeneration operation.

In this way, the new anonymous identifiers may be regenerated for the erroneous personal identifiers until the condition of the minimum allowable threshold $EA_{min}$ of the anonymization conformity is satisfied.

Next, the process of determining the conformity and regenerating the anonymous identifier when not all the personal identifiers existing in the original data set are mutually different values, and one personal identifier is exhibited multiple times in the original data set will be described.

When one personal identifier is exhibited multiple times in the original data set, an anonymous identifier has to be generated for the same person by the number of duplicates of the personal identifier, so that the personal identifier duplication characteristics of the original data set may be extracted as follows.

Total number of records in the original data set D=|D|
    number of records in which the personal identifier is duplicated one time=P1
    number of records in which the personal identifier is duplicated two times=P2
    number of records in which the personal identifier is duplicated three times=P3
    ..., and
    number of records in which the personal identifier is duplicated w times=Pw In this case, the total person number $|P_D|$ may be P1+P2++Pw, the total record number |D| may be P1+2P2+3P3+ ... +wPw, and the generated k-multiple anonymous identifiers may have anonymization conformity of 1 when the following conditions are satisfied so that the perfect conformity may be ensured.

$$|PD|/k=|G1|+|G2|+|G3|+ \ldots +|Gv|$$

where P1=|G1|, P2=|G2|, ..., and Pw=|Gv|

When the anonymization conformity is less than 1, the scheme of regenerating and correcting the anonymous identifiers generated as the errors may be similar to the scheme described above, but the correction may be performed for each cluster as follows.

Each cluster may be inspected to determine whether the cluster includes only k-multiple anonymous identifiers corresponding to the personal identifiers of the same k persons, and all the anonymous identifiers that do not correspond to the same k persons may be deleted. A new k-multiple anonymous identifier may be generated for all the personal identifiers corresponding to the deleted k-multiple anonymous identifiers, such that the new k-multiple anonymous identifier may be inspected to determine whether the new k-multiple anonymous identifier is included in the existing cluster, and the generation may be repeatedly performed until the new anonymous identifier is included in the existing cluster.

In order to reduce the number of repetitions, the maximum error value e may be reduced.

In this way, the k-multiple anonymous identifier may be regenerated for the erroneous personal identifiers until the condition of the minimum allowable threshold $EA_{min}$ of the anonymization conformity is satisfied.

The anonymized data according to the present invention as described above may be used by an information-transferring anonymous data combination utilization scheme, an information-combining anonymous data combination utilization scheme, an information-aggregating anonymous data combination utilization scheme, or the like according to a scheme of combining and utilizing the anonymized data.

The information-transferring anonymous data combination utilization scheme refers to a scheme of anonymizing required information in an information production area and transferring the anonymized information to an information consumption area as anonymous data for use.

The information (P, Up) produced in the information production area refers to personalized information Up produced for a personal identifier P. Assuming that the information Up is general information other than personal information, when the information (P, Up) is produced in the production area, an anonymous identifier AP may be generated for the personal identifier P in a safe space of the production area and converted into (anonymous identifier AP, production information Up).

The information anonymized as described above may be transferred to an outside of the safe space, so the information may be transferred to the information consumption area.

In the information consumption area, received anonymous information may be collected in chronological order.

When a request for using personalized information of a personal identifier Q occurs in the information consumption area, an anonymous identifier AQ for the personal identifier Q may be independently generated, and anonymous matching may be performed with anonymous identifiers of a personalized information DB that are received and collected in the information production area, so that production information corresponding to the same person may be utilized.

The information (AP, Up) of the APs that succeeded in the anonymous matching with the anonymous identifier AQ for the personal identifier Q refers to information produced for the personal identifier Q=P in the information production area, and the information (AP, Up) may be used for a person Q in the information consumption area. In this case, an anonymous identifier generation scheme, an anonymous identifier matching scheme, and an anonymous data combination scheme may be performed through a combination of various schemes described above.

The information production area and the information consumption area may be directly connected to each other, but several stages of independent personal information management areas may be interposed between the information production area and the information consumption area. In each intermediate area, the anonymous matching for the same personal identifier may be performed in a relay manner, and a result of the anonymous matching may be finally transferred to the information consumption area.

Figure 14A:
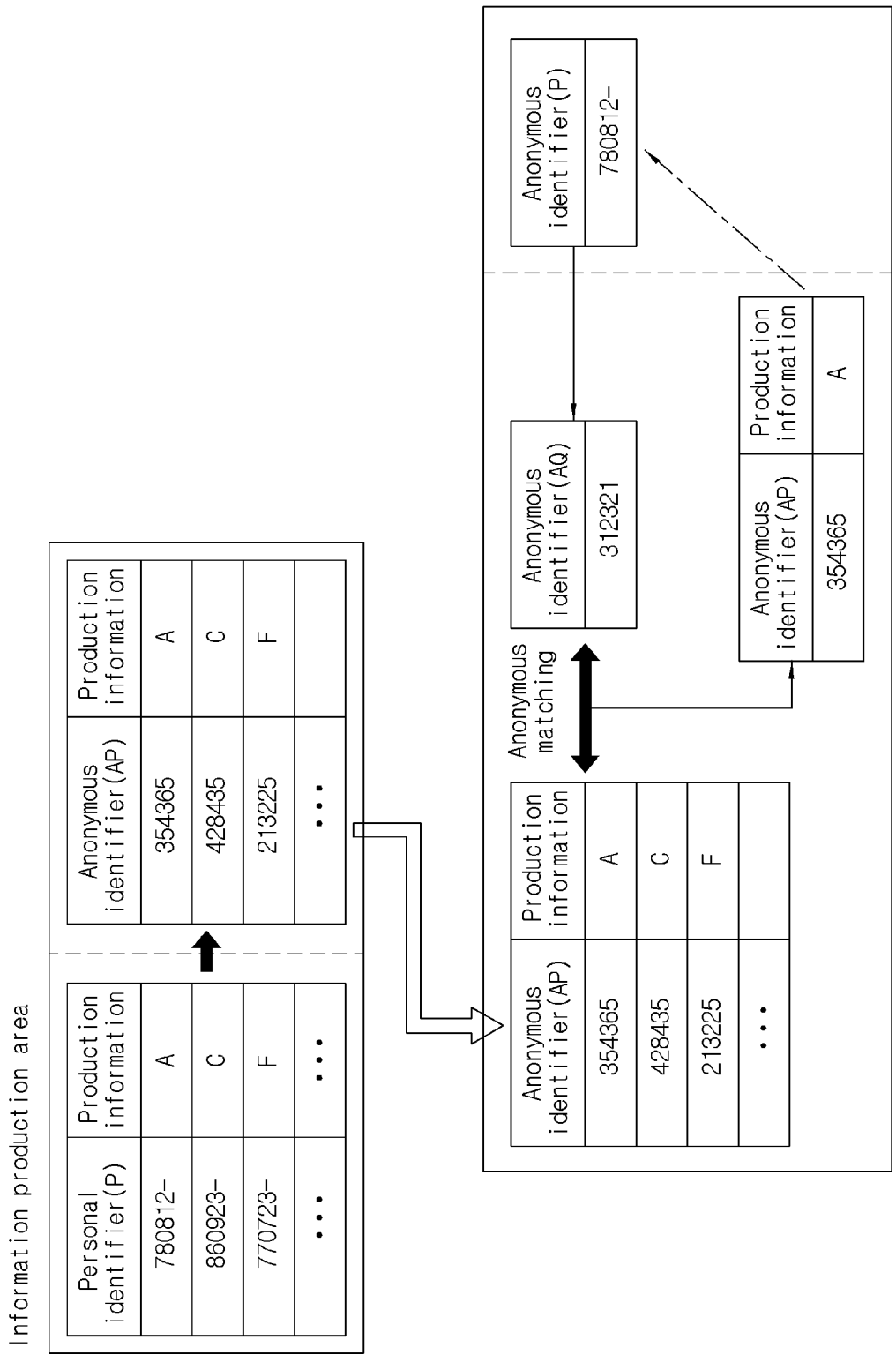
FIG. 14a is a view illustrating an information-transferring anonymous data utilization scheme.
Figure 14B:
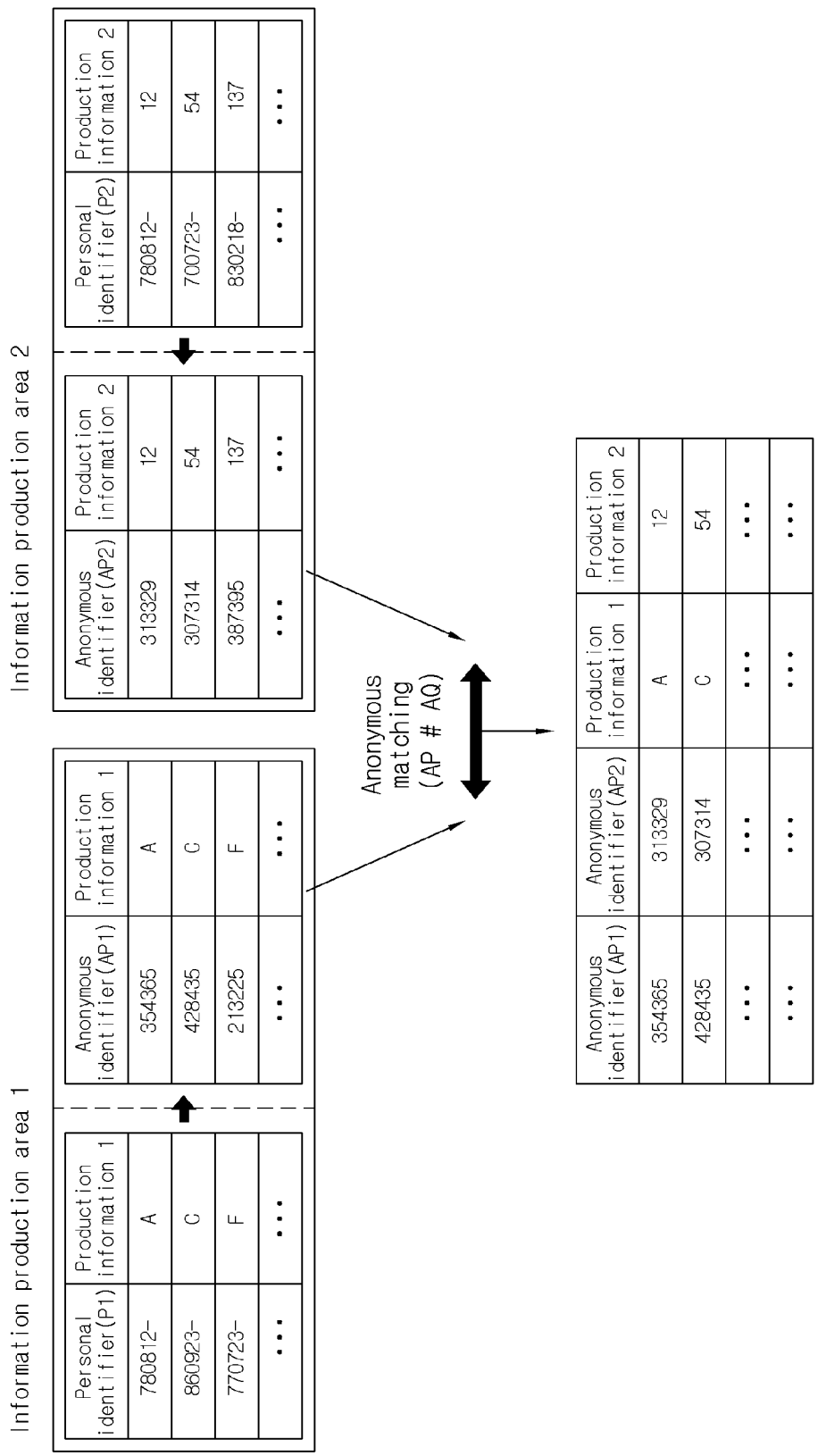
FIG. 14b is a view illustrating an information-combining anonymous data utilization scheme.

As illustrated in FIG. 14b, the information-combining anonymous data combination utilization scheme refers to a scheme of combining and utilizing all personalized information produced by a plurality of information production areas that continuously produce the personalized information.

An information combination scheme may be classified into a serial combination scheme and a parallel combination scheme. According to the serial combination scheme, two among several information production areas R1, R2, . . . , and Rn may be connected to each other as a pair ((R1, R2)→(R2, R3)→(R3, R4)→ . . . →(Rn−1, Rn)), so that as described above in the information-transferring combination utilization scheme, anonymous data combination may be repeatedly performed for each area pair, and the personalization information in which all data are combined may be generated in the last area Rn when the anonymous data combination is performed for the last pair.

According to the parallel combination scheme, an area Rp where final combination data is collected may be designated for all the information production areas R1, . . . , and Rn, so that the anonymous data combination may be performed between area pairs (R1, Rp), (R2, Pp), . . . , and (Rn, Rp) to store a final result of the anonymous data combination in the area Rp.

Figure 14C:
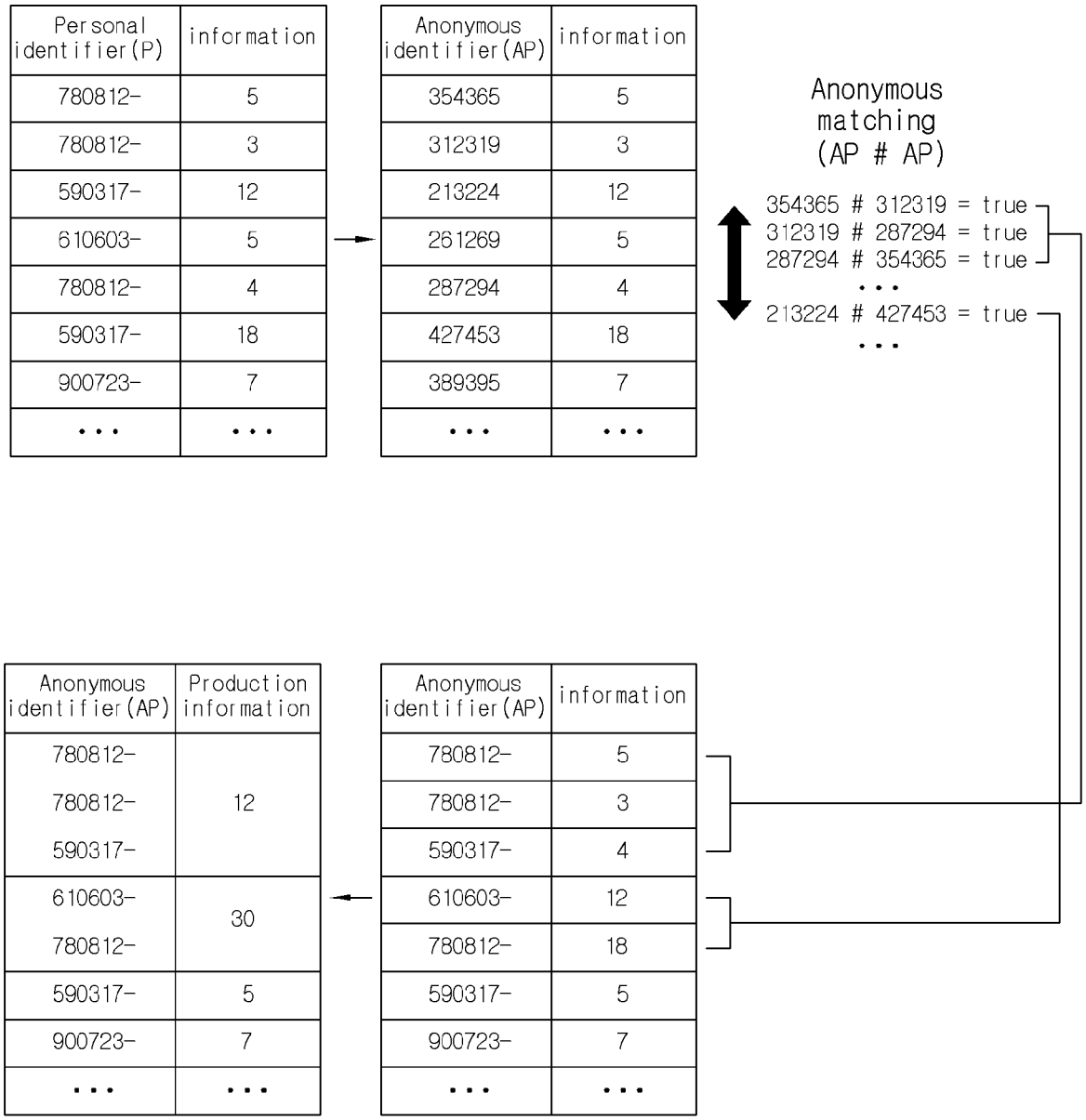
FIG. 14c is a view illustrating an information-aggregating anonymous data utilization scheme.

As illustrated in FIG. 14c, the information-aggregating anonymous data combination utilization scheme refers to a scheme of individually separating the anonymous data produced in the information production area for each of the same persons, or aggregating the anonymous data for each person for use. According to the anonymous identifier of the present invention, the same person may be represented by several anonymous identifiers, so that the anonymous identifiers for the same person are required to be separated. The above process may be the same as an operation of performing Group-by in a database for anonymous identifier attributes as personal identifiers.

When there is an anonymous data set D generated in the information production area R, a scheme similar to the discretization anonymous matching scheme described above may be used find the anonymous identifiers of the same person.

A personal identifier domain may be divided into preset discretization sections, and the generated information (AP, Up) may be stored in a bucket in a discretization section corresponding to a discretization section of each anonymous identifier AP of the anonymous data set produced in R. After the above operation is performed for all anonymous identifiers in R, when at least two anonymous identifiers, for example, a, b, and c exist in the bucket of a corresponding section from a first discretization section, anonymous matching operations a #b, a #c, and b #c may be performed for each pair, so that a separate list may be constructed by collecting anonymous identifiers of a person, which have the same result of the anonymous matching operations. In this case, it may be determined as the same person based on a synchronization validity minimum reliability threshold set by a user.

In this way, when the anonymous matching between anonymous identifiers in buckets of all discretization sections are performed, the anonymous identifier and the production information generated for each of individual persons in the information production area may be recognized as a separate list. Subsequently, when a required aggregation operation is performed on the production information Up, an aggregation result for each of the individual persons may be obtained from the anonymous data set, and the anonymous data may be transferred to other information consumption areas.

The invention claimed is:

1. A method for processing big data, the method being performed in a data server having a communication unit, a processing unit, and a storage unit to anonymize personal information in the big data, the method comprising:

forming a synchronization dictionary by converting synchronization target personal identification attribute values of an original personal identification data set into surrogate values substituting for the attribute values;

forming a synchronization table having information on a starting value and an end value of each of groups by grouping the surrogate values of the synchronization dictionary in a unit of at least one consecutive k (k≥1);

performing cell sectionalization of forming cell sections having information on a new starting value and a new end value by applying an error value to the information on the starting value and the end value of each of the groups of the synchronization table corresponding to the respective personal identification attribute value, for each of the personal identification attribute values of the original personal identification data set; and changing the personal identification attribute values of the original personal identification data set to correspond to section values of cells and assigning each of the changed attribute values as a synchronization attribute value of an anonymous data set, wherein the cell sectionalization includes setting a first value, which is obtained by subtracting a first arbitrary error value between a minimum error value and a maximum error value from a minimum value in the respective group, as a start value of a cell, and setting a second value, which is obtained by adding a second arbitrary error value between the minimum error value and the maximum error value to a maximum value in the respective group, as an end value of the cell, for each of the groups of the synchronization table.

2. The method of claim 1, wherein the synchronization dictionary is formed by applying a predefined function to the synchronization attribute value.

3. The method of claim 1, wherein the synchronization attribute value is formed as one data value obtained by concatenating the start value and the end value of the cell.

4. The method of claim 1, wherein the synchronization dictionary is formed by obtaining union of individual synchronization dictionaries that are formed by selecting a same original personal identification attribute from a plurality of mutually different original data sets as a synchronization target attribute.

5. The method of claim 1, wherein the synchronization dictionary is formed by using a part of the synchronization attribute value.

6. The method of claim 1, wherein, when ranges of section values of synchronization attributes generated for at least two personal identification attribute values overlap each other in a case where the synchronization attributes are generated, the synchronization attributes are regenerated so that a new error value is applied.

7. The method of claim 1, wherein, with reference to cell section information of a synchronization map including synchronization attributes of a plurality of anonymous data sets, it is determined whether cell sections corresponding to the synchronization attributes of records of the plurality of anonymous data sets overlap each other, and when the cell sections of the synchronization attributes overlap each other by a predetermined value or more, the records are determined to correspond to a same person so that the records are subject to an anonymous matching combination operation.

8. The method of claim 7, wherein it is determined whether cells corresponding to two anonymous identifiers (a, b) overlap each other by an anonymous matching operation defined as follows:

anonymous matching operation a #b=(true, C(a, b)) or (false, 0), wherein anonymous identifier a=(a.s, a.e), where a.s is a cell start value of a, and a.e is a cell end value of a, wherein anonymous identifier b=(b.s, b.e), where b.s is a cell start value of b, and b.e is a cell end value of b, and wherein C(a, b)=a probability value that records a and b exist in an overlapping section.

9. The method of claim 8, wherein an entire domain of synchronization attribute values is discretized in a unit of a fixed size to generate an empty anonymous identifier bucket in each of discretization sections, so that the anonymous matching operation is performed for anonymous identifiers commonly belonging to the bucket.

10. The method of claim 7, wherein the anonymous matching combination operation is performed in a unit of a record pair of two original data sets.

11. The method of claim 7, wherein anonymous identifiers of personal identifiers of two original data sets are collected to perform the anonymous matching combination operation on an anonymous identifier set of two anonymous data sets.

* * * * *